United States Patent
Kishigami et al.

(10) Patent No.: US 8,620,221 B2
(45) Date of Patent: Dec. 31, 2013

(54) BASE STATION DEVICE, TERMINAL DEVICE, AND WIRELESS COMMUNICATION SYSTEM

(75) Inventors: Takaaki Kishigami, Tokyo (JP); Shozo Okasaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 400 days.

(21) Appl. No.: 12/866,014

(22) PCT Filed: Feb. 5, 2009

(86) PCT No.: PCT/JP2009/000445
§ 371 (c)(1),
(2), (4) Date: Aug. 3, 2010

(87) PCT Pub. No.: WO2009/098880
PCT Pub. Date: Aug. 13, 2009

(65) Prior Publication Data
US 2010/0323625 A1 Dec. 23, 2010

(30) Foreign Application Priority Data

Feb. 5, 2008 (JP) .................................. 2008-025746
Feb. 4, 2009 (JP) .................................. 2009-024017

(51) Int. Cl.
*H04B 1/00* (2006.01)
(52) U.S. Cl.
USPC .......... 455/65; 455/101; 455/114.2; 455/448; 455/506; 455/500; 455/501; 370/310; 370/329
(58) Field of Classification Search
USPC ................. 455/63.1, 65.1, 114.2, 278.1, 296
See application file for complete search history.

(56) References Cited

U.S. PATENT DOCUMENTS 6,172,564 B1 * 1/2001 Rzyski .......................... 330/149
8,018,903 B2 * 9/2011 Onggosanusi et al. ....... 370/334
(Continued)

FOREIGN PATENT DOCUMENTS

CN       1802800       7/2006
JP    2007-515091 A   6/2007
(Continued)

OTHER PUBLICATIONS

Ohgane et al., A Study on a Channel Allocation Scheme with an Adaptive Array in SDMA, IEEE 47th VTC(2), 1997, pp. 125-129.*
(Continued)

*Primary Examiner* — Fayyaz Alam
*Assistant Examiner* — Mohammed Rachedine
(74) *Attorney, Agent, or Firm* — Dickinson Wright PLLC

(57) ABSTRACT

A base station device (10) communicates between a first terminal device and a second terminal device over the same channel by spatial multiplexing. The base station device (10) comprises an interference cancellation coefficient extractor (30) that extracts an interference cancellation coefficient from a signal received from the first terminal device to cancel interference on a propagation channel with the first terminal device in advance, and transmits a pilot signal that contains information related to the interference cancellation coefficient to the second terminal device. In addition, the base station device (10) also comprises an interference canceller (16) that uses the interference cancellation coefficient to cancel an interference component from transmission data to be transmitted over the same channel, and transmits the transmission data from which the interference component has been canceled by the interference canceller (16) to the first terminal device and the second terminal device over the same channel. A wireless communication system is provided which, in a multi-user MIMO, suppresses superimposed interference components resulting from channel fluctuations and channel estimation errors when interference cancellation is performed in advance in a base station unit on a modulated signal to be transmitted.

12 Claims, 16 Drawing Sheets

(56) References Cited

U.S. PATENT DOCUMENTS

| | | | |
|---|---|---|---|
| 2002/0051433 A1* | 5/2002 | Affes et al. | 370/335 |
| 2006/0013327 A1* | 1/2006 | Sugar et al. | 375/260 |
| 2008/0008110 A1* | 1/2008 | Kishigami et al. | 370/310 |
| 2008/0240031 A1* | 10/2008 | Nassiri-Toussi et al. | 370/329 |
| 2009/0279486 A1* | 11/2009 | Kishigami et al. | 370/329 |

FOREIGN PATENT DOCUMENTS

| | | |
|---|---|---|
| JP | 2007-215008 A | 8/2007 |
| WO | 2005/048485 | 5/2005 |
| WO | 2005/048485 A1 | 5/2005 |

OTHER PUBLICATIONS

Costa, "Writing on Dirty Paper," IEEE Transactions on Information Theory IT-29(3): 439-441, May 1983.

Foschini, "Layered Space-Time Architecture for Wireless Communication in a Fading Environment When Using Multi-Element Antennas," Bell Labs Technical Journal (Lucent Technologies Inc.), Aug. 1996, pp. 41-59.

Hara et al., "Spatial Scheduling with Mutual Interference Cancellation in Multiuser MIMO Downlink," IEICE Technical Report RCS2006-98 106(168): 233-238, Jul. 12, 2006.

Harashima et al., "Matched-Transmission Technique for Channels With Intersymbol Interference," IEEE Transactions on Communications COM-20(4): 774-780, Aug. 1972.

Hochwald et al., "A Vector-Perturbation Technique for Near-Capacity Multiantenna Multiuser Communication—Part II: Perturbation," IEEE Transactions on Communications 53(3): 537-544, Mar. 2005.

Ohgane et al., "A Study on a Channel Allocation Scheme with an Adaptive Array in SDMA," IEEE VTC 47(2): 725-729, 1997.

Spencer et al., "An Introduction to the Multi-User MIMO Downlink," IEEE Communications Magazine, pp. 60-67, Oct. 2004.

Spencer et al., "Zero-Forcing Methods for Downlink Spatial Multiplexing in Multiuser MIMO Channels," IEEE Transactions on Signal Processing 52(2): 461-471, Feb. 2004.

Tomlinson, M., "New Automatic Equaliser Employing Modulo Arithmetic," Electronics Letters 7(5/6): 138-139, Mar. 25, 1971.

International Search Report for PCT/JP2009/000445 mailed May 12, 2009, 4 pages.

Chinese Office Action dated Mar. 1, 2013.

\* cited by examiner

BASE STATION DEVICE, TERMINAL DEVICE, AND WIRELESS COMMUNICATION SYSTEM

RELATED APPLICATIONS

This application is based upon and claims the benefit of priority from Japanese Patent Application No. 2008-025746, filed in Japan on Feb. 5, 2008, and from Japanese Patent Application No. 2009-024017, filed in Japan on Feb. 4, 2009, the disclosures of which are incorporated herein in its entirety by reference.

TECHNICAL FIELD

The present invention relates to a base station device, a terminal device, a wireless communication system, and a wireless communication method for performing wireless communication using space division multiple access.

BACKGROUND ART

In recent years, demands for larger capacity and higher speed in wireless communications have increased, resulting in quite a number of studies being carried out to improve the effective utilization rate of finite frequency resources. One method of improving the effective utilization rate of frequency resources that is attracting attention involves utilizing space domains. An adaptive array antenna (adaptive antenna) is a technique for using space domains. An adaptive array antenna adjusts an amplitude and a phase of a reception signal through the use of a weighting coefficient (hereinafter, the weighting coefficient shall be referred to as a "weight") to be multiplied onto the reception signal so as to strongly receive a signal arriving from a desired direction and suppress a signal arriving from a direction of interference waves. Accordingly, a communication capacity of a system can be improved.

Other techniques that utilize space domains take advantage of a spatial orthogonality of a propagation path to transmit different data series using a physical channel having the same time, same frequency, and same sign (hereinafter referred to as a "same physical channel"). Such techniques include: (1) space division multiple access (hereinafter referred to as "SDMA") that uses the same physical channel to transmit different data series to different terminal devices; and (2) spatial multiplexing (hereinafter referred to as "SDM") that uses the same physical channel to transmit different data series to the same terminal device.

SDMA technique is described in, for example, "A study on a channel allocation scheme with an adaptive array in SDMA" (T. Ohgane et al., IEEE 47th VTC, Page(s): 725-729, vol. 2 (1997)). SDMA can be implemented if a spatial correlation coefficient between terminal devices is lower than a predetermined value. SDMA enables an improvement in throughput and an increase in simultaneous transmission capacity of a wireless communication system.

SDM technique is described in, for example, "Layered space-time architecture for wireless communication in a fading environment when using multi-element antennas" (G. J. Foschini, Bell labs Tech. J, pp. 41-59, Autumn 1996). A transmitter and a receiver both comprise a plurality of antenna elements and are capable of realizing SDM transmission in a propagation environment where correlation of reception signals between antennas is low. The transmitter transmits, for each antenna element, a different data series using a same physical channel. The receiver separates and receives reception signals based on different data series received by a plurality of antennas. By using a plurality of spatial multiplexing channels in this manner, data transmission rate can be increased without having to use multilevel modulation. When performing an SDM transmission, in an environment where a large number of scatterers exist between a transmitter and a receiver under sufficient S/N (signal-to-noise ratio) conditions, communication capacity can be expanded in proportion to the number of antennas (the transmitter and the receiver have the same number of antennas).

Multiuser MIMO is a technique that merges the SDMA and SDM techniques described above. A multiuser MIMO technique is described in, for example, "Zero-Forcing Methods for Downlink Spatial Multiplexing in Multiuser MIMO channels" (Q. Spencer et al., IEEE Trans. SP, Vol. 52, No. 2, pp. 461-471, 2004). The multiuser MIMO technique enables space division multiple access due to spatial multiplexing and directionality under a condition where a channel matrix of a concurrently-connected receiver is known by a transmitter. Due to the multiuser MIMO technique, even when the number of antennas of the receiver is limited, an improvement in throughput and an increase in simultaneous transmission capacity of a wireless communication system can be realized by using a multiuser antenna or by appropriately selecting combinations of antennas with respect to a plurality of receivers existing in a communication area. As a method of further improving an effective frequency utilization efficiency of the multiuser MIMO technique, for example, a method that is an application of dirty paper coding (hereinafter referred to as "DPC") described in "Writing on dirty paper" (M. Costa, IEEE Trans. Inform. Theory, vol. 29, pp. 439-441, May 1983) has been proposed in "An Introduction to the Multi-User MIMO Downlink", (Quentin H. Spencer, Christian B. Peel, A. Lee Swindlehurst, Martin Haardt, IEEE Communications Magazine, Vol. 42, Issue 10, pp. 60-67, October, 2004). The document describes that throughput can be significantly improved under ideal conditions by applying DPC to multiuser MIMO technique.

DISCLOSURE OF THE INVENTION

Problems to be Solved by the Invention

However, conventional multiuser MIMO transmission using DPC has the following problems. When using DPC, since interference is cancelled in advance by a transmitter, a signal component not included in a channel estimate acquired in advance by a receiver ends up being superimposed. Consequently, a channel status during transmission of data from which interference has been cancelled becomes different from the channel estimate acquired in advance by the receiver. Therefore, an interference component cannot be sufficiently suppressed even when spatial interference suppression is carried out by a terminal device using an MMSE principle or the like, resulting in greater property degradation of reception quality.

The present invention has been made in consideration of the above, and an object thereof is to provide a wireless communication system that suppresses an interference component superimposed due to the application of DPC in multiuser MIMO.

Means for Solving the Problems

A wireless communication system according to the present invention comprises a plurality of terminal devices and a base station device that communicates with a first terminal device and a second terminal device among the plurality of terminal devices over the same channel by spatial multiplexing, wherein the first terminal device comprises: an interference cancellation coefficient calculator that calculates an interference cancellation coefficient for cancelling interference on a propagation channel between the first terminal device and the base station device; and an interference cancellation coefficient transmitter that transmits the interference cancellation coefficient to the base station device, the base station device comprises: an interference cancellation coefficient receiver that receives the interference cancellation coefficient from the first terminal device; a control signal transmitter that generates a control signal including a pilot signal based on the interference cancellation coefficient and transmits the control signal to the terminal devices; an interference canceller that uses the interference cancellation coefficient to cancel an interference component from transmission data to be transmitted to the first terminal device; and a data transmitter that transmits the transmission data, from which the interference component has been canceled by the interference canceller, with transmission data to be transmitted to the second terminal device, over the same channel, and the second terminal device comprises: a signal receiver that receives the control signal transmitted from the base station device; a channel estimator that uses the interference cancellation coefficient included in the control signal to estimate a propagation channel between the second terminal device and the base station device; and a demodulator that uses information on the propagation channel to demodulate data transmitted from the base station device.

As will be described below, the present invention also includes other modes. As such, the disclosure of the present invention is intended to provide a part of the present invention and is not intended to limit the scope of the present invention as described and claimed herein.

BEST MODE FOR CARRYING OUT THE INVENTION

Figure 1:
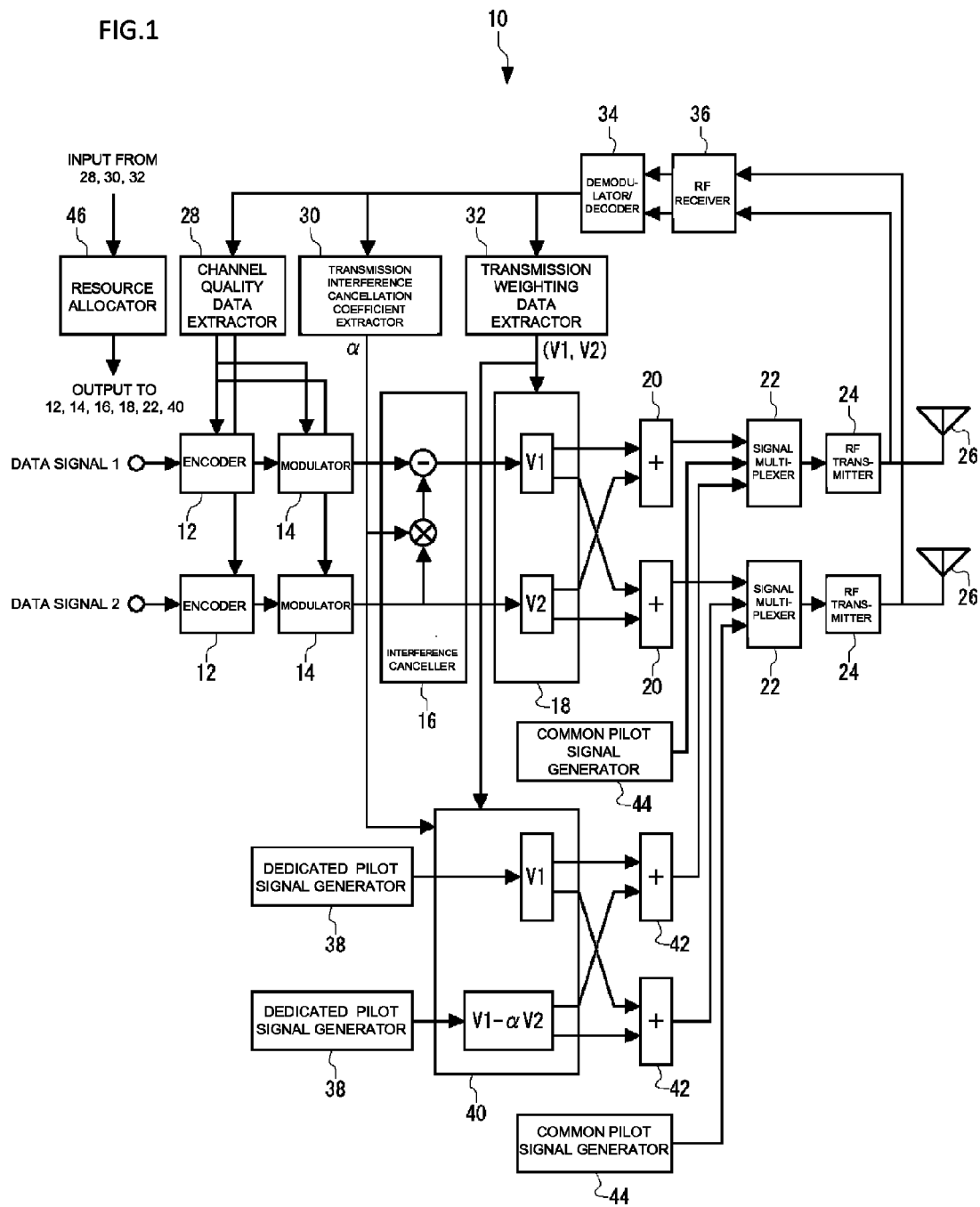
FIG. 1 is a diagram illustrating a configuration of a base station device according to a first embodiment.

Hereinafter, a detailed description of the present invention will be given. It is to be understood that the embodiments of the present invention described hereinafter are illustrative only and various modifications can be made to the present invention. As such, the specific configurations and functions disclosed below are not intended to limit the scope of the present invention.

A base station device according to an embodiment of the present invention is a base station device that communicates with a first terminal device and a second terminal device over the same channel by spatial multiplexing, the base station device comprising: an interference cancellation coefficient extractor that extracts an interference cancellation coefficient for cancelling interference on a propagation channel with the second terminal device from a signal received from the first terminal device; a control signal transmitter that generates a control signal including a pilot signal based on the interference cancellation coefficient and transmits the control signal to the terminal devices; an interference canceller that uses the interference cancellation coefficient to cancel an interference component from transmission data to be transmitted to the first terminal device; and a data transmitter that transmits the transmission data, from which the interference component has been canceled by the interference canceller, with transmission data to be transmitted to the second terminal device, over the same channel.

By transmitting a control signal including an interference cancellation coefficient to a terminal device in this manner, a terminal device can appropriately obtain information on a propagation channel with a base station device while taking into consideration a signal component not included in a channel estimate acquired in advance. Accordingly, even in a case where propagation channel information includes an error attributable to the base station device performing, in advance, interference cancellation on a modulated signal to be transmitted, the terminal device can suppress an interference signal from another terminal device to be spatially multiplexed and inhibit reception property degradation. For example, in multiuser MIMO, data transmission efficiency can be enhanced and frequency utilization efficiency can be improved.

The base station device according to the present embodiment may further comprise: a transmission weight multiplier that weights a pilot signal used by a terminal device for estimating a propagation channel according to a value of the interference cancellation coefficient; and a dedicated pilot signal generator that generates a dedicated pilot signal obtained by the transmission weight multiplier, wherein the control signal transmitter may transmit the dedicated pilot signal.

Since an interference cancellation coefficient can be calculated based on a magnitude of a weight on a dedicated pilot signal, an overhead during data transmission for notifying the interference cancellation coefficient can be reduced.

The base station device according to the present embodiment may further comprise: a signal multiplexer that generates a pilot signal formed by multiplexing a control signal for notifying the interference cancellation coefficient and a pilot signal for estimating a propagation channel, wherein the control signal transmitter may transmit a signal generated by the signal multiplexer. In this case, the signal multiplexer may generate a signal formed by further multiplexing the dedicated pilot signal or a signal formed by multiplexing the control signal subjected to the same weighting as the dedicated pilot signal.

By generating a signal formed by multiplexing a control signal for notifying an interference cancellation coefficient and transmitting the signal to a terminal device in this manner, the interference cancellation coefficient can be appropriately notified to the terminal device.

In the base station device according to the present embodiment, the interference cancellation coefficient extractor may comprise an interference cancellation coefficient storage that stores the interference cancellation coefficient in association with an identifier, the interference cancellation coefficient extractor may extract information on an identifier indicating the interference cancellation coefficient, and the interference canceller may read out an interference cancellation coefficient corresponding to the identifier from the interference cancellation coefficient storage and use the interference cancellation coefficient to cancel an interference component.

By notifying an interference cancellation coefficient using an identifier stored in an interference cancellation coefficient storage in this manner, the amount of data used to notify an interference cancellation coefficient can be reduced.

The terminal device according to the present embodiment is a terminal device that communicates with a base station device that performs spatial multiplexing with a plurality of terminal devices, the terminal device comprising: a signal receiver that receives a control signal transmitted from the base station device and which includes a pilot signal generated based on an interference cancellation coefficient; a channel estimator that uses the interference cancellation coefficient included in the control signal to estimate a propagation channel with the base station device; and a demodulator that uses information on the propagation channel to demodulate data transmitted from the base station device.

By estimating a propagation channel with a base station device using an interference cancellation coefficient included in a control signal transmitted from the base station in this manner, information on the propagation channel with the base station device can be appropriately obtained while taking into consideration a signal component not included in a channel estimate acquired in advance. Accordingly, even in a case where propagation channel information includes an error attributable to the base station device performing, in advance, interference cancellation on a modulated signal to be transmitted, an interference signal from another terminal device spatially multiplexed onto the same channel can be suppressed and reception property degradation can be inhibited. Consequently, multiuser MIMO transmission efficiency can be enhanced and frequency utilization efficiency can be improved.

A wireless communication system according to the present embodiment comprises a plurality of terminal devices and a base station device that communicates with a first terminal device and a second terminal device among the plurality of terminal devices over the same channel by spatial multiplexing, wherein the first terminal device comprises: an interference cancellation coefficient calculator that calculates an interference cancellation coefficient for cancelling interference on a propagation channel with the base station device; and an interference cancellation coefficient transmitter that transmits the interference cancellation coefficient to the base station device, the base station device comprises: an interference cancellation coefficient receiver that receives an interference cancellation coefficient for cancelling interference on a propagation channel with the second terminal device from the first terminal device; a control signal transmitter that generates a control signal including a pilot signal based on the interference cancellation coefficient and transmits the control signal to the terminal devices; an interference canceller that uses the interference cancellation coefficient to cancel an interference component from transmission data to be transmitted to the first terminal device; and a data transmitter that transmits the transmission data, from which the interference component has been canceled by the interference canceller, with transmission data to be transmitted to the second terminal device, over the same channel, and the second terminal device comprises: a signal receiver that receives the control signal transmitted from the base station device; a channel estimator that uses the interference cancellation coefficient included in the control signal to estimate a propagation channel with the base station device; and a demodulator that uses information on the propagation channel to demodulate data transmitted from the base station device.

Due to the configuration described above, in the same manner as a base station device according to the present embodiment, even in a case where propagation channel information includes an error attributable to the base station device performing, in advance, interference cancellation on a modulated signal to be transmitted, the terminal device can suppress an interference signal from another terminal device to be spatially multiplexed and inhibit reception property degradation. Moreover, various configurations of the base station device according to the present embodiment can be applied to a base station device to be used in the wireless communication system according to the present embodiment.

A wireless communication method according to the present embodiment is a wireless communication method to be used by a base station device that communicates with a first terminal device and a second terminal device over the same channel by spatial multiplexing, the wireless communication method comprising the steps of: the base station device receiving an interference cancellation coefficient for cancelling interference on a propagation channel with the second terminal device from a signal received from the first terminal device; the base station generating a control signal including a pilot signal based on the interference cancellation coefficient and transmitting the control signal to the terminal devices; using the interference cancellation coefficient to cancel an interference component from transmission data to be transmitted to the first terminal device; and transmitting the transmission data, from which the interference component has been canceled by the interference canceller, with transmission data to be transmitted to the second terminal device, over the same channel.

Due to the configuration described above, in the same manner as a base station device according to the present embodiment, even in a case where propagation channel information includes an error attributable to the base station device performing, in advance, interference cancellation on a modulated signal to be transmitted, the second terminal device can suppress an interference signal from the first terminal device and inhibit reception property degradation. Moreover, various configurations of the base station device according to the present embodiment can be applied to a base station device to be used in the wireless communication method according to the present embodiment.

Hereinafter, a wireless communication system according to the present embodiment will be described with reference to the drawings.

Figure 2:
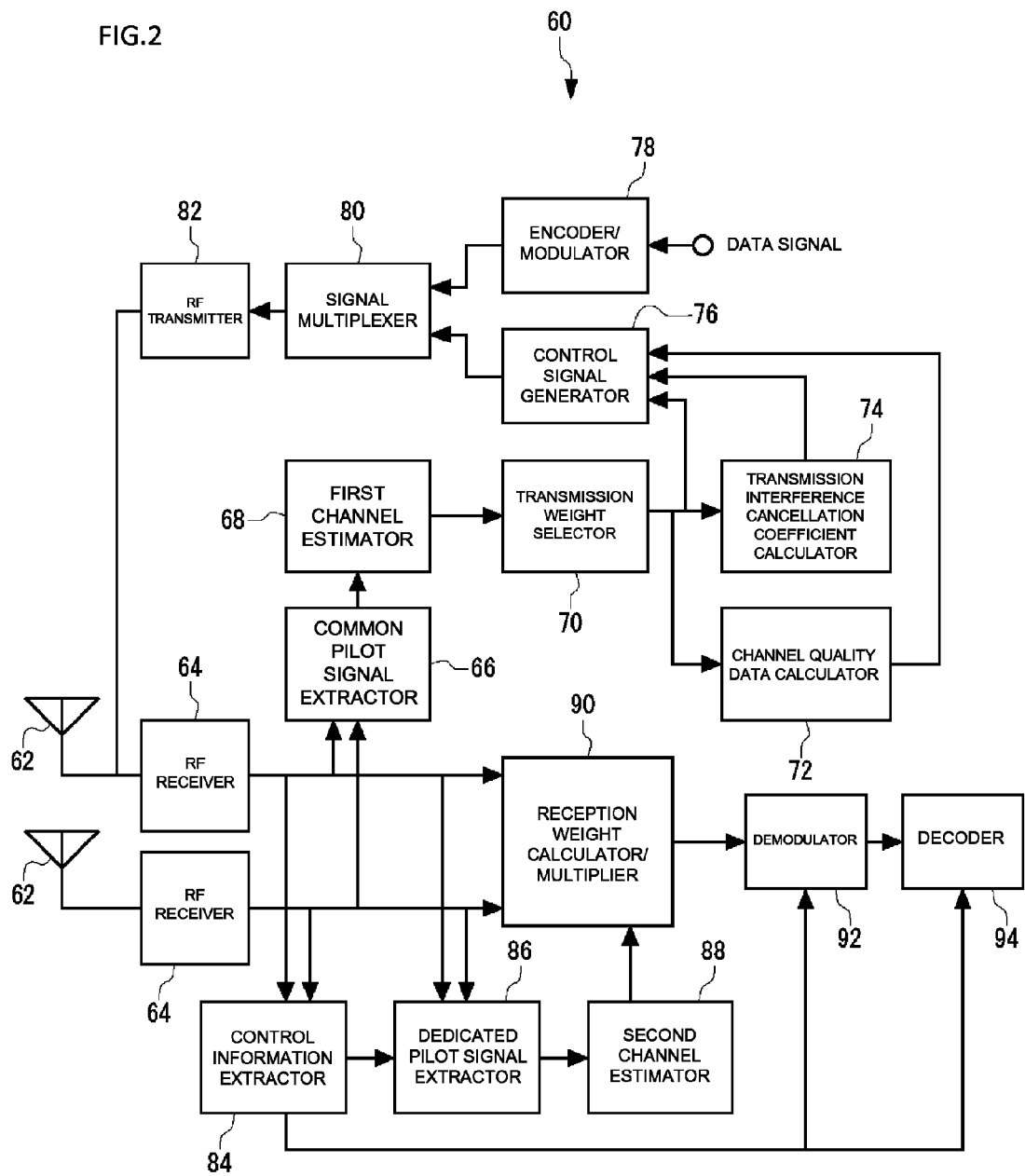
FIG. 2 is a diagram illustrating a configuration of a terminal device according to the first embodiment.
Figure 3:
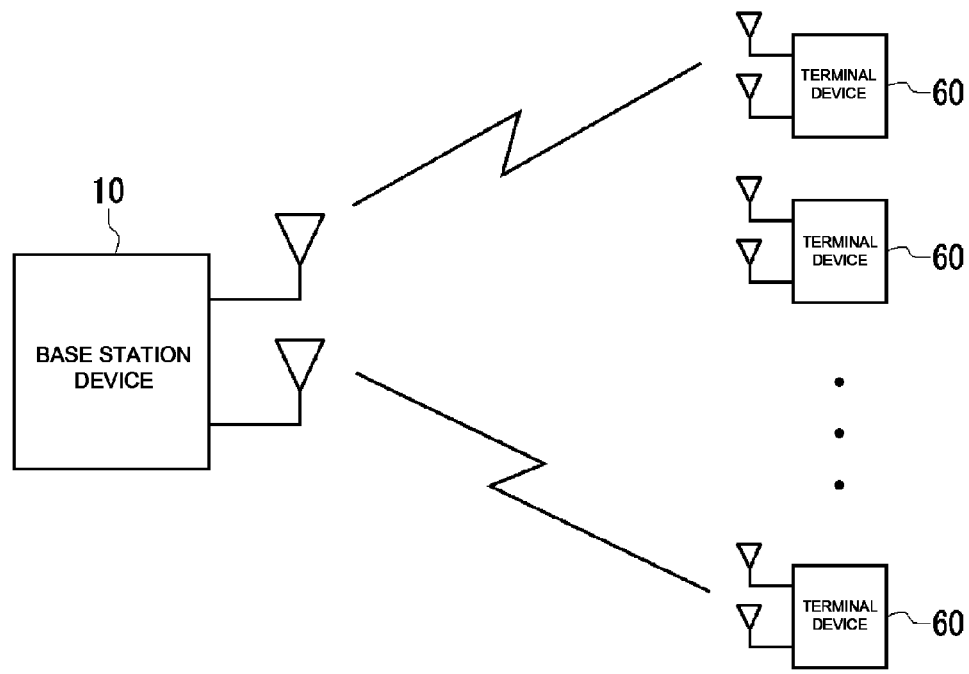
FIG. 3 is a diagram illustrating a configuration of a wireless communication system according to the first embodiment.

FIG. 1 is a diagram illustrating a configuration of a base station device 10 according to the present embodiment; FIG. 2 is a diagram illustrating a configuration of a terminal device 60 according to the present embodiment; and FIG. 3 is a diagram illustrating a configuration of a wireless communication system comprising the base station device 10 and the terminal device 60. First, the entire wireless communication system will be described with reference to FIG. 3, followed by a description on the configurations of the base station device 10 and the terminal device 60.

The wireless communication system comprises a base station device 10 and a plurality of terminal devices 60. Note that in the present specification, an mth terminal device among the plurality of terminal devices 60 will be denoted by adding a hyphenated character such as terminal device 60-$m$. In FIG. 3, while the base station device 10 and the terminal device 60 respectively have two antennas 26, the number of antennas is not limited to two. The following description will be given on the premise that the base station device 10 has Nt number of antennas and the terminal device 60 has Ns number of antennas. Hereinafter, configurations of the base station device 10 and the terminal device 60 will be described.

[Base Station Device]

FIG. 1 is a diagram illustrating a configuration of the base station device 10. The base station device 10 comprises: a plurality of encoders 12 that encodes a data signal to be transmitted to respective terminal devices 60; a plurality of modulators 14 that modulate the encoded data signal; an interference canceller 16 that cancels interference from the modulated signal; a first transmission weight multiplier 18 that multiplies the interference-cancelled modulated signal by a transmission weight; an adder 20 that adds the interference-cancelled modulated signal; a signal multiplexer 22 that multiplexes a common pilot signal and a dedicated pilot signal onto the added modulated signal; an RF transmitter 24 that converts the multiplexed signal into a wireless signal; and the plurality of antennas 26 that transmits the wireless signal. The RF transmitter 24 and the antennas 26 which function to transmit a signal generated by the signal multiplexer 22 correspond to the control signal transmitter and the data transmitter described in the claims.

A channel quality data extractor 28 is connected to the encoder 12 and the modulator 14. The channel quality data extractor 28 extracts channel quality data from a reception signal received from the terminal device 60 via an RF receiver 36 and a demodulator/decoder 34. The channel quality data extractor 28 extracts channel quality data from signals received from the respective terminal devices 60. Therefore, the channel quality data has a different value for each terminal device 60. Here, channel quality data of a terminal device 60-$m$ will be denoted as channel quality data $Q^{(m)}$. Similarly, for other parameters to be described below, whenever a different value exists for each terminal device 60, values thereof will be denoted in the same manner by adding a superscript of (m) and the like.

The channel quality data extractor 28 notifies the channel quality data $Q^{(m)}$ to the encoder 12 and the modulator 14. Based on the channel quality data $Q^{(m)}$, the encoder 12 and the modulator 14 encode and modulate transmission data to be transmitted to the terminal device 60-$m$.

A transmission interference cancellation coefficient extractor 30 is connected to the interference canceller 16. The transmission interference cancellation coefficient extractor 30 extracts transmission interference cancellation coefficient data $\alpha(k-L)^{(m)}$ from a reception signal received from the terminal device 60-$m$ via the RF receiver 36 and the demodulator/decoder 34, where k represents a discrete time and (k–L) represents a period in which a transmission weight or an interference cancellation coefficient had been measured by the terminal device 60-$m$.

A transmission weighting data extractor 32 is connected to the first transmission weight multiplier 18. The transmission weighting data extractor 32 extracts transmission weighting data $V1(k-L)^{(m)}$ and $V2(k-L)^{(m)}$ from a reception signal received from the terminal device 60-$m$. In this case, the transmission weighting data V1 and V2 is selected by a maximum SNR criterion and a minimum SNR criterion at the terminal device 60-$m$. Details on obtaining transmission weighting data V1 and V2 will be given in the description of the configuration of the terminal device 60.

Interference cancellation coefficient data and transmission weighting data are obtained at time k based on a propagation path status before a discrete time L.

For transmission weighting data, a method can be used in which transmission weighting data is notified using a number (identifier) stored in a transmission weight table shared between the base station device 10 and the terminal device 60. Accordingly, since transmission weighting data only requires information on a transmission weight number, the amount of information when notifying a transmission weight can be reduced. Similarly, for channel quality data and transmission interference cancellation coefficient data, a method can be used in which an appropriately quantized reception quality table is shared between the base station device 10 and the terminal device 60 and channel quality data is notified using a number stored in the channel quality table (reception quality table). For example, a reception quality table and a transmission weight table are stored in the transmission interference cancellation coefficient extractor 30 and the transmission weighting data extractor 32 of the base station device 10. The reception quality table and the transmission weight table are stored in a transmission interference cancellation coefficient calculator 74, a transmission weight selector 70, and a channel quality data calculator 72 of the terminal device 60.

Accordingly, the amount of information can be reduced down to just a predetermined number of quantization bits and the amount of feedback from the terminal device 60 to the base station device 10 can be reduced.

As another channel quality data notification method, a multilevel modulation/encoding ratio table that associates numbers of multilevel modulation and encoding ratios based on a measured channel quality can be shared by the base station device 10 and the terminal device 60, whereby reception quality data is to be notified using a number stored in the multilevel modulation/encoding ratio table. Accordingly, the amount of information when notifying channel quality can be reduced. The multilevel modulation/encoding ratio table is stored in the channel quality data extractor 28 of the base station device 10 and the channel quality data calculator 72 of the terminal device 60.

Based on the transmission interference cancellation coefficient data $\alpha(k-L)$, the interference canceller 16 performs interference cancellation so as to reduce interference between terminal devices 60 to be spatially multiplexed. In other words, after performing interference cancellation on a data signal series $d_s(k)$ addressed to an sth terminal device 60-$s$, a data signal is transmitted. A data signal $g_s(k)$ after interference cancellation may be given by expression (1) below, where s=1, 2.

[Expression 1]

$$\begin{bmatrix} g_1(k) \\ g_2(k) \end{bmatrix} = \begin{bmatrix} d_1(k) - \alpha(k-L)d_2(k) \\ d_2(k) \end{bmatrix} \quad (1)$$

Based on extracted transmission weighting data (V1, V2), the first transmission weight multiplier 18 multiplies the data signal (including a user individual control signal) to be transmitted to the terminal device 60 by a transmission weight. A signal $y_g(g)$ is generated by multiplying a signal series $g_s(k)$ outputted from the interference canceller 16 by a transmission weight expressed below, where s denotes a natural number equal to or smaller than the number of users connected by spatial multiplexing. In the present embodiment, a case where the number of spatial multiplexing is 2 is presented. Thus, in the following expression (2), s=1, 2. In addition, V1, V2, and $y_g$ represent column vectors including Nt-dimensional elements.

[Expression 2]

$$y_g(k) = [\, V_1(k-L) \quad V_2(k-L)\,] \begin{bmatrix} g_1(k) \\ g_2(k) \end{bmatrix} \quad (2)$$

The signal multiplexer 22 multiplexes a common pilot signal series $y_p(k)$, a dedicated pilot signal series $y_q(k)$, and the data signal series $y_g(k)$ using any of FDM, TDM, and CDM or a combination thereof to generate and output a pilot signal having a predetermined frame configuration. The pilot signal generated by multiplexing will now be described.

Figure 4:
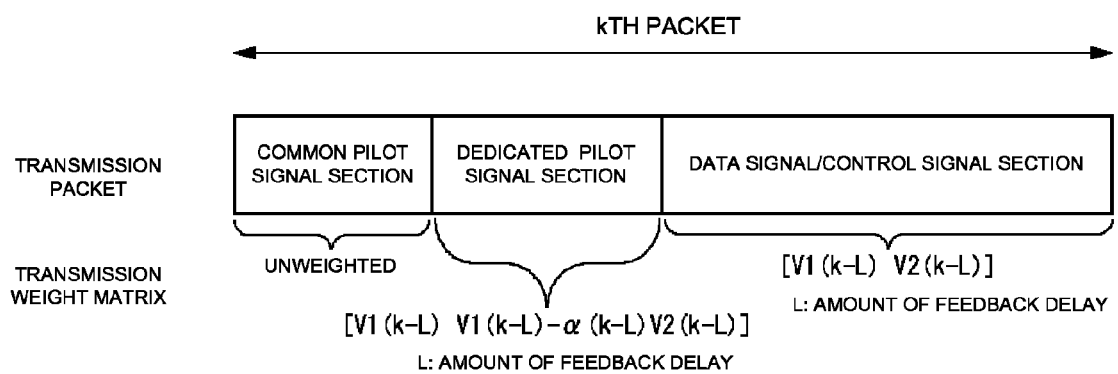
FIG. 4 is a diagram illustrating a frame configuration of a pilot signal according to the first embodiment.

FIG. 4 illustrates an example of a frame configuration of a pilot signal to be transmitted from the base station. In the example illustrated in FIG. 4, a common pilot signal and a dedicated pilot signal are multiplexed using TDM. The frame includes a common pilot signal section, a dedicated pilot signal section, and a data signal/control signal section. Using any of FDM, TDM, and CDM or a combination thereof, the common pilot signal is multiplexed for each of the plurality of antennas 26 and the dedicated pilot signal is multiplexed for each weight formed by a plurality of transmission weights. Accordingly, the terminal device 60 can separate and receive the pilot signals and perform channel estimation per antenna 26 or per weight.

The base station device 10 comprises a common pilot signal generator 44 and a dedicated pilot signal generator 38 that generate a common pilot signal and a dedicated pilot signal to be multiplexed onto a data signal. The common pilot signal generator 44 generates a common pilot signal series $p_n(k)$, where n denotes a natural number equal to or smaller than the number of transmitting antennas Nt and k denotes a discrete time. The common pilot signal generator 44 inputs the generated common pilot signal to the signal multiplexer 22. In other words, the common pilot signal series $p_n(k)$ is not multiplied by a transmission weight.

The dedicated pilot signal generator 38 inputs the generated dedicated pilot signal to the second transmission weight multiplier 40. A dedicated pilot signal series to be transmitted to an m1th terminal device 60-$m1$ will now be described. The second transmission weight multiplier 40 multiplies a dedicated pilot signal series $q_s(k)$ by a weight based on transmission weighting data (V1$^{(m1)}$, V2$^{(m1)}$) and on transmission interference cancellation coefficient data $\alpha(k-L)^{(m1)}$, and outputs the dedicated pilot signal multiplied by weight. In other words, a signal is generated by multiplying an sth dedicated pilot signal series $q_s(k)$ by a transmission weight. The following expression (3) represents a signal $y_q(k)$ multiplied by a transmission weight for s=1, 2, where $y_q$ denotes a column vector including an Nt-dimensional element.

[Expression 3]

$$y_q(k) = [\, V_1 \quad \{V_2 - \alpha(k-L)V_1\}\,] \begin{bmatrix} q_1(k) \\ q_2(k) \end{bmatrix} \quad (3)$$

The base station device 10 comprises a resource allocator 46. The resource allocator 46 determines a combination of terminal devices 60 to be spatially multiplexed based on transmission weighting data (V1$^{(m)}$, V2$^{(m)}$) outputted from the transmission weighting data extractor 32 and on reception quality data Q$^{(m)}$ outputted from the channel quality data extractor 28, and allocates resources such as a frequency, a time, a sign, and the like.

In FIG. 1, output signals from the channel quality data extractor 28, the transmission interference cancellation coefficient extractor 30, and the transmission weighting data extractor 32 are inputted to the resource allocator 46. The resource allocator 46 outputs a resource allocation signal including a combination of terminal devices 60 to be spatially multiplexed, a frequency, a time, a code, and the like to the encoder 12, the modulator 14, the interference canceller 16, the first transmission weight multiplier 18, the second transmission weight multiplier 40, and the signal multiplexer 22.

Figure 6:
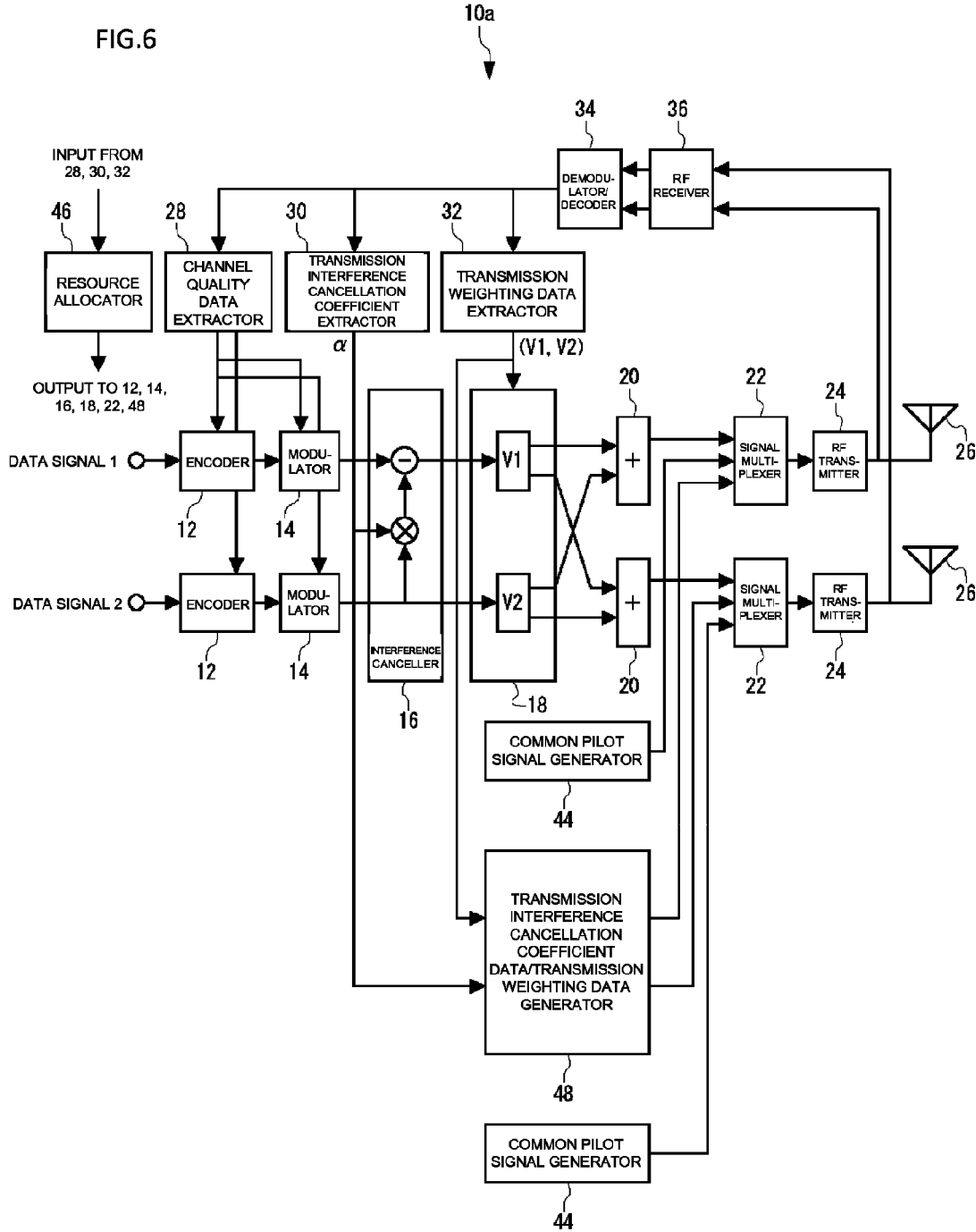
FIG. 6 is a diagram illustrating a configuration of a base station device according to a second embodiment.

In FIG. 6, output signals from the channel quality data extractor 28, the transmission interference cancellation coefficient extractor 30, and the transmission weighting data extractor 32 are inputted to the resource allocator 46. The resource allocator 46 outputs a resource allocation signal including a combination of terminal devices 60 to be spatially multiplexed, a frequency, a time, a sign, and the like to the encoder 12, the modulator 14, the interference canceller 16, the transmission weight multiplier 18, the signal multiplexer 22, and a transmission interference cancellation coefficient data/transmission weighting data generator 48.

A method of determining a combination of terminal devices 60 to be spatially multiplexed is as follows. With respect to a terminal device 60-$m1$, another terminal device 60-$m2$ to be simultaneously multiplexed is combined such that a transmission weight V2$^{(m1)}$ selected by a minimum SNR criterion becomes equal to a transmission weight V1$^{(m2)}$ selected by a maximum SNR weight criterion to the terminal device 60-$m2$. In other words, terminal devices 60-$m1$ and 60-$m2$ such that V2$^{(m1)}$=V1$^{(m2)}$ are combined. At this point, the relationship of V2$^{(m2)}$=V1$^{(m1)}$ need not necessarily be true. According to this method, a combination that increases directional gain while reducing radiant interference and an interfered amount between simultaneously-multiplexed terminal devices 60 can be realized.

Once terminal devices 60-$m1$ and 60-$m2$ to be spatially multiplexed are determined, the resource allocator 46 notifies the terminal devices 60-$m1$ and 60-$m2$ that dedicated data transmission is to be performed. In doing so, control information including MCS data and transmission power data during data transmission is to be transmitted as a control signal. When dedicated data transmission is to be performed at a power equivalent to a transmission power during transmission of a dedicated pilot signal, transmission power data of the dedicated data signal need not be included in control information. In addition, as an alternative method, when sending a dedicated data signal at a different transmission power than the dedicated pilot signal, control information including transmission power data is to be transmitted from the base station device 10 to the terminal device 60.

[Terminal Device]

FIG. 2 is a diagram illustrating a configuration of the terminal device 60. As a configuration for processing a common pilot signal and feeding back a processing result to the base station device 10, the terminal device 60 comprises a common pilot signal extractor 66, a first channel estimator 68, a transmission weight selector 70, a channel quality data calculator 72, a transmission interference cancellation coefficient calculator 74, a control signal generator 76, an encoder/modulator 78, and a signal multiplexer 80.

In addition, as a configuration for decoding a received data signal, the terminal device 60 comprises a control information extractor 84, a dedicated pilot signal extractor 86, a second channel estimator 88, a reception weight calculator/multiplier 90, a demodulator 92, and a decoder 94.

Hereinafter, respective configurations of the terminal device 60 will be described. The common pilot signal extractor 66 receives a signal via an antenna 62 and an RF receiver 64, and extracts a common pilot signal from the reception signal.

The first channel estimator 68 performs channel estimation based on a reception result of a common pilot signal $y_p(k)$ transmitted from the base station device 10. A channel estimation result (hereinafter referred to as a "channel estimate") of the first channel estimator 68 can be expressed as a matrix given by expression (4) below.

[Expression 4]

$$H(m) = \begin{bmatrix} h^m(1,1) & h^m(1,2) & \ldots & h^m(1,N_t) \\ h^m(2,1) & h^m(2,2) & \ldots & h^m(2,N_t) \\ \vdots & \vdots & \vdots & \vdots \\ h^m(N_s(m),1) & h^m(N_s(m),2) & \ldots & h^m(N_s(m),N_t) \end{bmatrix} \quad (4)$$

When a propagation path is in a flat fading environment, the total number of channel estimates of an mth terminal device 60-$m$ can be expressed as ($N_r$: the number of common pilot signal series)×($N_s(m)$: the number of receiving antennas of terminal device 60-$m$). In expression (4), $h^m(j_2,j_1)$ denotes a channel estimate when the terminal device 60-$m$ receives a $j_1$th common pilot signal series with a $j_2$th antenna 62.

The transmission weight selector 70 selects specific transmission weights (V1, V2) according to the following selection criteria from a fixed transmission weight group $u_n$ that is mutually known between the base station device 10 and the terminal device 60. In addition, the transmission weight selector 70 uses the selected transmission weight V1 to estimate a reception quality based on a maximum SNR in the event of transmitting a data signal. In addition, as an alternative method, a reception quality based on an SINR using a maximum SNR obtained by a maximum SNR criterion and a minimum SNR obtained by a minimum SNR criterion may be estimated. An SINR is calculated as, for example, (maximum SNR/minimum SNR).

A transmission weight selection method will be given below. As a maximum SNR criterion, a fixed transmission weight V1 that provides a maximum SNR is selected using a channel estimate H(m). In expression (5), n denotes a natural number equal to or smaller than a maximum number of fixed transmission weight candidates.

[Expression 5]

$$V1 = \left\{ u_n \,\middle|\, \max_n \|H(m)u_n\|^2 \right\} \quad (5)$$

In addition, as a minimum SNR criterion, a fixed transmission weight V2 that provides a minimum SNR is selected using the channel estimate H(m).

[Expression 6]

$$V2 = \left\{ u_n \,\middle|\, \min_n \|H(m)u_n\|^2 \right\} \quad (6)$$

Moreover, a feedback of a transmission weight selection result from the terminal device 60 to the base station device 10 is performed by any of: (1) sending index data of a selection result of two kinds of transmission weights (V1, V2); (2) sending index data of a two-dimensional table (x, y) that combines two kinds of transmission weights; and (3) sending index data of a table restricted to a portion of combinations of a two-dimensional table that combines two kinds of transmission weights (for example, a table is used limited to combinations of weights by excluding weights adjacent to each other in a main weighting direction). In the case of the third method, search candidates of transmission weights to be selected by the minimum SNR criterion can be searched from a subset of limited transmission weight combinations, thereby enabling a reduction in computation quantity. The table is stored in the transmission weight selector 70.

The transmission interference cancellation coefficient calculator 74 calculates an interference cancellation coefficient $\alpha^{(m)}$ on the assumption that: transmission is performed using the transmission weight V2 to another terminal device 60 to be spatially multiplexed; transmission is performed using the transmission weight V1 to a terminal device 60 of the same base station; and reception is performed at the receiving side using a maximum ratio combining weight.

[Expression 7]

$$\alpha^{(m)} = \frac{(H(m)V_1^{(m)})^H H(m)V_2^{(m)}}{\|H(m)V_1^{(m)}\|^{2}} \quad (7)$$

By using such an interference cancellation coefficient $\alpha^{(m)}$, a property improvement effect due to DPC as is conventional can be obtained for one terminal device 60-$m$ among spatially-multiplexed terminal devices 60 under an ideal condition realized when there are no errors are included in the channel estimate H(m) and fluctuation does not occur. In addition, the interference cancellation coefficient can be calculated as a single complex number coefficient that does not depend on the number of transmitting antennas Nt of the base station device 10 and the number of receiving antennas Ns(m) of the terminal device 60-$m$. In other words, even when the number of transmitting antennas Nt and the number of receiving antennas Ns are large, the amount of information related to the interference cancellation coefficient to be notified to the base station device 10 remains the same. Therefore, a significant reduction effect on the amount of information related to the interference cancellation coefficient to be fed back to the base station device 10 can be obtained particularly when the number of transmitting antennas Nt or the number of receiving antennas Ns is large.

The control signal generator 76 generates a control signal for feeding back interference cancellation coefficient data, channel reception quality data, and selected transmission weighting data to the base station device 10.

The signal multiplexer 80 multiplexes an output signal from the encoder/modulator 78 that is an encoded and modulated data signal with an output signal from the control signal generator 76. Signal multiplexing is performed using any of FDM, TDM, CDM or a multiplexing method that is a combination thereof.

The control information extractor 84 extracts control information including resource allocation data, dedicated pilot signal series data, channel quality data when performing data transmission (MCS data), and power transmission data from the control signal transmitted from the base station device 10. In this case, the dedicated pilot signal series data includes information on a dedicated pilot signal series by which a desired data signal is to be transmitted. In other words, information is included which indicates which of the transmission weights V1 or V2 is being used for transmission.

The dedicated pilot signal extractor 86 extracts a dedicated pilot signal from a signal received via the RF receiver 64. The second channel estimator 88 performs channel estimation based on a reception result of a dedicated pilot signal $y_q(k)$ transmitted from the base station device 10. A channel estimation result (hereinafter referred to as a "channel estimate") obtained here can be expressed as a matrix Z(m). In addition, the following expression (8) represents a second channel estimation matrix Z(m) for Nb=2. Hereinafter, Z(m) will be referred to as a second channel estimation matrix.

[Expression 8]

$$Z(m) = \begin{bmatrix} z^m(1,1) & z^m(1,2) \\ z^m(2,1) & z^m(2,2) \\ \vdots & \vdots \\ z^m(N_s(m),1) & z^m(N_s(m),2) \end{bmatrix} \quad (8)$$
$$= H(m_s)[\ V_1 \quad \{V_2 - \alpha(k-L)V_1\}\ ]$$

When a propagation path is in a flat fading environment, the total number of channel estimates at the terminal device 60-*m* can be expressed as (Nb: the number of dedicated pilot signal series transmitted from the base station)×($N_s(m)$: the number of receiving antennas of terminal device 60-*m*). In expression (8), $z^m(j, s)$ denotes a channel estimate when the terminal device 60 receives an sth dedicated pilot signal series with a jth antenna 62.

The reception weight calculator/multiplier 90 uses the second channel estimation matrix estimated by the second channel estimator 88 to calculate a reception weight and multiplies an output signal from the RF receiver 64 by the reception weight. In this case, a reception weight is calculated based on a ZF criterion, an MMSE criterion, or the like. With a ZF criterion, an inverse matrix $Z^{-1}(m)$ of the second channel estimation matrix Z(m) is calculated, and when a desired data signal is to be transmitted by a transmission signal of Vs according to dedicated pilot signal series data, a row vector comprising an sth row of the inverse matrix $Z^{-1}(m)$ is to be used as a reception weight. Accordingly, even when an error is included in the channel estimate H(m), an interference signal to a terminal device 60 to be spatially multiplexed can be cancelled.

The demodulator 92 and the decoder 94 perform a demodulating operation and a decoding operation on an output of the reception weight calculator/multiplier 90.

[Operations of Wireless Communication System]

Figure 5:
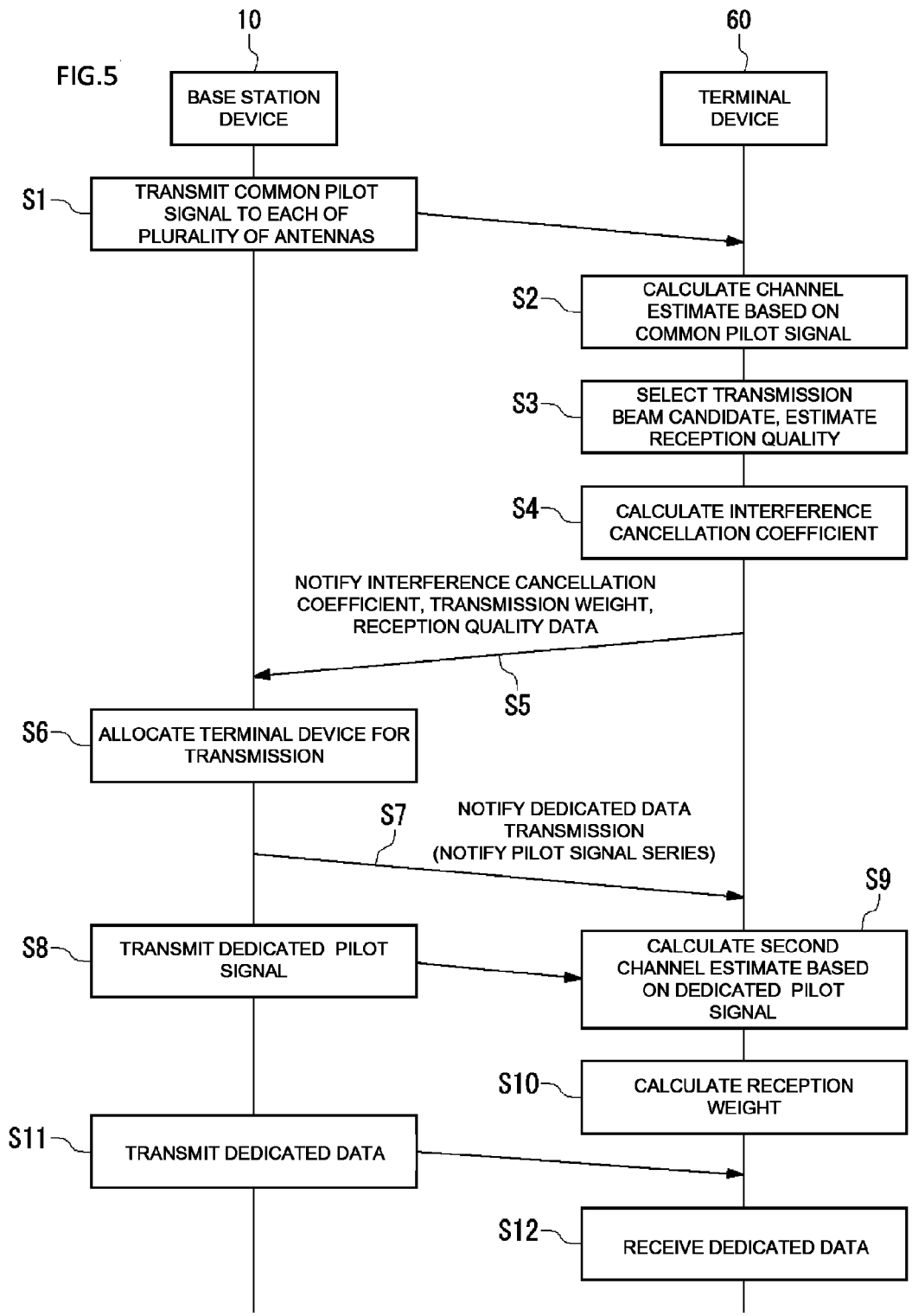
FIG. 5 is a diagram illustrating operations of a wireless communication system according to the first embodiment.

FIG. 5 is a flow chart illustrating operations of a wireless communication system according to the present embodiment. Hereinafter, operations of the wireless communication system will be described with reference to FIG. 5. An nth common pilot signal generator 44 of the base station device 10 generates a common pilot signal series $p_n(k)$ and transmits the generated common pilot signal to the terminal device 60 (step S1).

Upon receiving the common pilot signal transmitted from the base station device 10, the terminal device 60 performs channel estimation based on a reception result of a common pilot signal $y_p(k)$ and obtains a channel estimate (step S2). The transmission weight selector 70 of the terminal device 60 then selects specific transmission weights (V1, V2) according to the selection criteria described above from a fixed transmission weight group $u_n$ that is mutually known between the base station device 10 and the terminal device 60, and further estimates a reception quality based on a maximum SNR in the event that a data signal is transmitted using the selected transmission weight V1 (step S3).

Subsequently, the transmission interference cancellation coefficient calculator 74 of the terminal device 60-*m* calculates an interference cancellation coefficient α(m) (step S4). As described above, the interference cancellation coefficient α(m) assumes that: transmission is performed using the transmission weight V2 to another terminal device 60 to be spatially multiplexed; transmission is performed using the transmission weight V1 to a terminal device 60 of the same base station; and reception is performed at the receiving side using a maximum ratio combining weight.

The control signal generator 76 of the terminal device 60 generates a control signal for feeding back interference cancellation coefficient data, channel reception quality data, and selected transmission weighting data to the base station device 10, and notifies the generated control signal to the base station device 10 (step S5).

The base station device 10 uses the resource allocator 46 to determine a combination of terminal devices 60 to be spatially multiplexed based on transmission weighting data ($V1^{(m)}$, $V2^{(m)}$) and reception quality data $Q^{(m)}$ transmitted from the plurality of terminal devices 60, and allocates resources such as a frequency, a time, a sign, and the like (step S6). After terminal devices 60 to be spatially multiplexed are determined, the base station device 10 notifies the terminal devices 60 that dedicated data transmission is to be performed (step S7). Additionally, in doing so, the base station device 10 transmits control information including MCS data and transmission power data during data transmission as a control signal.

The terminal device 60 uses the control information extractor 84 to extract control information including resource allocation data, dedicated pilot signal series data, channel quality data when performing data transmission (MCS data), and power transmission data from the control signal transmitted from the base station device 10 (step S7).

After dedicated data transmission notification, the base station device 10 transmits a dedicated pilot signal to the terminal device 60 (step S8). The dedicated pilot signal transmitted at this point is a signal obtained by multiplying a dedicated pilot signal series $q_s(k)$ by a weight based on transmission weighting data ($V1^{(m1)}$, $V2^{(m1)}$) and on transmission interference cancellation coefficient data $\alpha(k-L)^{(m1)}$.

Upon receiving a dedicated pilot signal, the terminal device 60 uses the second channel estimator 88 to perform channel estimation based on a reception result of the dedicated pilot signal $y_q(k)$ and calculates a channel estimate (step S9). The reception weight calculator/multiplier 90 of the terminal device 60 uses the second channel estimation matrix estimated by the second channel estimator 88 to calculate a reception weight (step S10), and multiplies an output signal from the RF receiver 64 by the reception weight.

The base station device 10 processes a data signal to be transmitted to the terminal device 60 with the encoder 12, the modulator 14, the interference canceller 16, and the first transmission weight multiplier 18, and transmits the processed dedicated data to the terminal device 60 (step S11). Upon receiving dedicated data from the base station device 10, the terminal device 60 uses the demodulator 92 and the decoder 94 to perform a demodulating operation and a decoding operation on an output of the reception weight calculator/multiplier 90 (step S12). This concludes the description on configurations and operations of the base station device 10 and the terminal device 60 according to the present embodiment.

[Advantageous Effects of the Present Embodiment]

According to the present embodiment, when there are no error fluctuations in a propagation channel at the time of data signal transmission, a result of a channel estimation matrix obtained by the first channel estimator 68 and a data signal $d_1(k)$ to be transmitted to the terminal device 60 may be given by the following expression (9). Note that the expression (9) represents a case where s=1, 2. As shown in expression (9), using a maximum ratio combining reception weight $w_1=[H(m_1)V1]^H$, reception can now be performed without being affected by a same-channel interference signal from a terminal device 60 to be spatially multiplexed. In expression (9), the superscript H denotes a complex conjugate operator.

[Expression 9]

$$w_1 H(m_1) y_g(k) = [H_1 V_1(k-L)]^H H(m_1) [\ V_1(k-L) \quad V_2(k-L)\ ] \begin{bmatrix} g_1(k) \\ g_2(k) \end{bmatrix} \quad (9)$$
$$= \|H(m_1)V_1(k-L)\|^2 d_1(k)$$

In addition, a reception signal $r_s(k)$ when a result of a channel estimation matrix $H(m_s)$ obtained by the first channel estimator 68 of the terminal device 60-$m_s$ and a propagation channel at the time of data signal transmission include error fluctuations may be given by the following expression (10). Note that the expression (10) represents a case where s=1, 2.

[Expression 10]

$$r_s(k) = H(m_s)V_1[d_1(k) - \alpha(k-L)d_2(k)] + H(m_s)V_2 d_2(k) \quad (10)$$
$$= H(m_s)[\ V_1 \quad \{V_2 - \alpha(k-L)V_1\}\ ]\begin{bmatrix} d_1(k) \\ d_2(k) \end{bmatrix}$$

In this case, by calculating a reception weight using the channel estimate $Z(m_s)$ obtained by the second channel estimator 88, the data signal $d_s(k)$ to be transmitted to the terminal device 60 can be received without being affected by a same-channel interference signal from another terminal device 60 to be spatially multiplexed.

Furthermore, according to the present embodiment, the amount of transmission interference cancellation data $\alpha$ to be transmitted to the base station device 10 as feedback information from the terminal device 60 and overhead during data transmission can be reduced and data transmission efficiency can be increased. Moreover, even when errors or fluctuations exist in propagation channel estimates, an interference signal from another user can be suppressed from the side of the terminal device 60 and reception property degradation can be suppressed. Consequently, same-channel interference waves from users to be spatially multiplexed can be reduced from the transmitting side and the transmission efficiency during spatial multiplexing transmission to a plurality of terminal devices 60 can be enhanced. As a result, frequency utilization efficiency can be improved.

Moreover, in the present embodiment, since a transmitting-side interference cancellation effect and a receiving-side maximum ratio combining reception effect can be obtained with respect to a terminal device 60 to which a data signal is to be transmitted using a transmission weight V1 when the amount of channel fluctuations or channel estimation errors is low, reception quality can be improved significantly. Therefore, scheduling that utilizes this characteristic may be applied. For example, the wireless communication system may perform scheduling such that a terminal device existing on a cell edge, a terminal device with a large distance decay, and a terminal device with low reception quality are preferentially allocated as the terminal device 60 to which a data signal is to be transmitted using a transmission weight V1. For example, a terminal device 60 existing on a cell edge is subjected to significant intercell interference. However, by using the transmission weight V1 and preferentially allocating the terminal device 60 as a terminal device to which a data signal is to be transmitted, a degree of freedom of the antenna 62 can be used to suppress interference from other cells due to a DPC effect (an effect of cancelling same-channel interference of terminal devices 60 to be spatially multiplexed from the transmitting side). Accordingly, in addition to a spatial multiplexing effect, suppression of interference from other cells is enabled and cell edge throughput can be improved.

By allocating a terminal device with low channel fluctuations as the terminal device 60, a reduction in a reception quality improvement effect attributable to channel fluctuation errors can be prevented. For example, a status of the amount of channel fluctuations of the terminal device 60 can be realized by performing feedback from the terminal device 60 to the base station device 10.

By allocating a terminal device with low channel estimation error as the terminal device 60, a reduction in a reception quality improvement effect attributable to channel estimation errors can be prevented. For example, as a terminal device with low channel estimation error, scheduling is performed such that a terminal device 60 in the vicinity of the base station device 10, a terminal device 60 with high reception SNR, or the like is preferentially allocated as the terminal device 60 to which a data signal is to be transmitted using a transmission weight V1.

For the present embodiment, an example where spatial multiplexing transmission is performed to a plurality of terminal devices 60 has been described. That is, although an example has been described where dedicated data signals are respectively transmitted by spatial multiplexing to a terminal device 60-$m1$ and a different terminal device 60-$m2$, the present invention is not limited to this example. The present invention can also be applied to a case where a dedicated data signal to the terminal device 60-$m1$ and a broadcast signal to a plurality of terminal devices 60-$m2$ are transmitted by spatial multiplexing. In addition, as another application example, a dedicated data signal to a relay device instead of the terminal device 60 and a dedicated data signal to another terminal device 60 can be transmitted by spatial multiplexing. Furthermore, as another method, a dedicated data signal to the terminal device 60 and a dedicated data signal to the same terminal device 60 can be spatially-multiplexed as a so-called single user MIMO.

For the present embodiment, a configuration has been described in which the terminal device 60 selects a transmission weight from a plurality of weight candidates fixed in advance and the selected weight is notified to the base station device 10. However, as an alternative method, an adaptive transmission weight using a QR decomposition as described in conventional examples may be used. In this case, notifying a channel estimate of a propagation path in advance to the base station device 10 or having the terminal device 60 feed back information related to a transmission weight adaptively generated based on a result of a first channel estimate shall suffice.

Moreover, for the present embodiment, while an operation by the interference canceller 16 according to a DPC process disclosed in "Writing on dirty paper" based on an interference cancellation coefficient α to be transmitted from a terminal device has been described, interference cancellation operations by the interference canceller based on the interference cancellation coefficient α is not limited thereto. A similar effect can be achieved by alternatively using a Tomlinson-Harashima precoding method disclosed in "New automatic equalizer employing modulo arithmetic" (M. Tomlinson (March 1971). Electron. Lett. 7: 138-139), "Matched-transmission technique for channels with intersymbol interference" (H. Harashima and H. Miyakawa (August 1972). IEEE Trans. Commun. COM-20: 774-780) or a vector perturbation technique disclosed in "A vector-perturbation technique for near-capacity multiantenna multiuser communication-Part II: Perturbation" (B. M. Hochwald, C. B. Peel, and A. L. Swindlehurst (March 2005). IEEE Trans. Commun. 53: 537-544).

Second Embodiment

Figure 7:
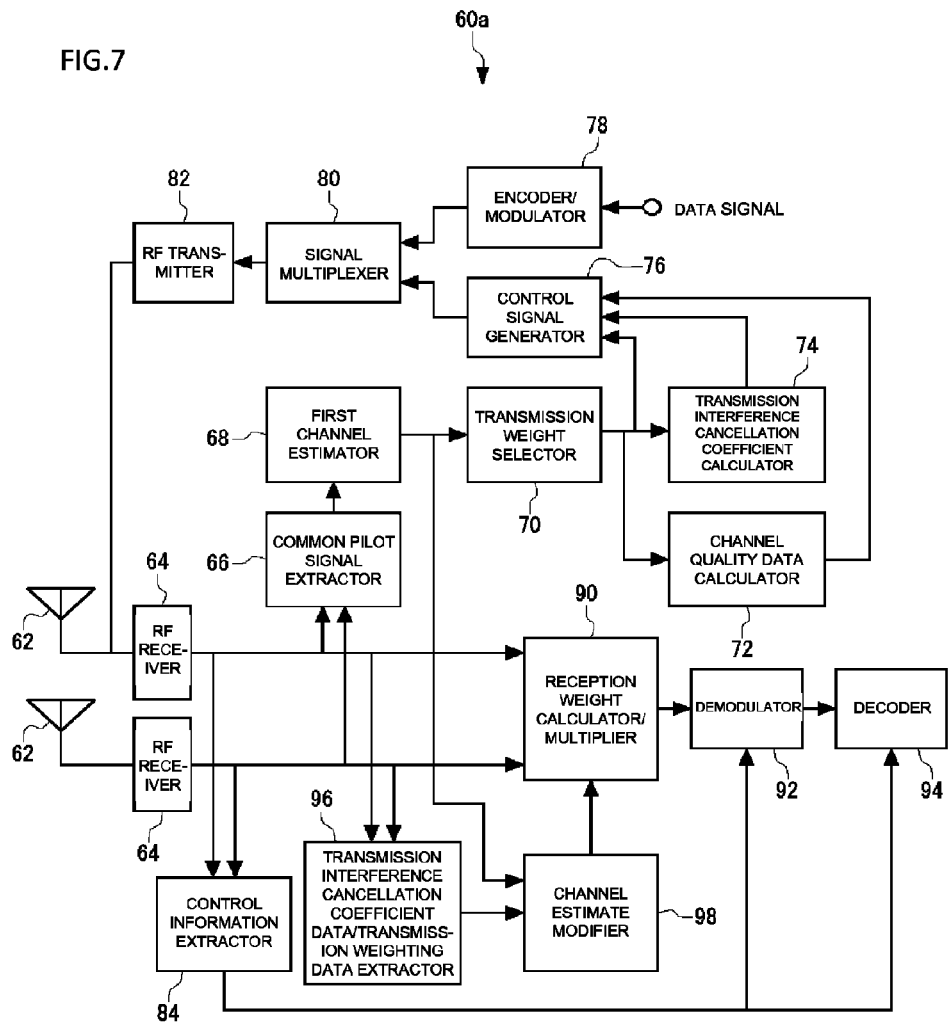
FIG. 7 is a diagram illustrating a configuration of a terminal device according to the second embodiment.

FIG. 6 is a diagram illustrating a configuration of a base station device 10a according to a second embodiment, and FIG. 7 is a diagram illustrating a configuration of a terminal device 60a according to the second embodiment. Hereinafter, a wireless communication system according to the second embodiment will be described with reference to FIGS. 6 and 7.

While the basic configuration of the base station device 10a according to the second embodiment is the same as the basic configuration of the base station device 10 according to the first embodiment, a transmission interference cancellation coefficient data/transmission weighting data generator 48 is provided in place of the dedicated pilot signal generator 38 and the second transmission weight multiplier 40.

The transmission interference cancellation coefficient data/transmission weighting data generator 48 generates a control signal series for notifying transmission weighting data ($V1^{(m1)}$, $V2^{(m1)}$) and transmission interference cancellation coefficient data $\alpha(k-L)^{(m1)}$ to an mlth terminal device 60a-m1. The transmission interference cancellation coefficient data/transmission weighting data generator 48 inputs the generated control signal series to a signal multiplexer 22. The signal multiplexer 22 multiplexes a common pilot signal series $y_p(k)$, the control signal series, and a data signal series $y_g(k)$ using any of FDM, TDM, and CDM or a combination thereof to generate and output a signal having a predetermined frame configuration.

Figure 8:
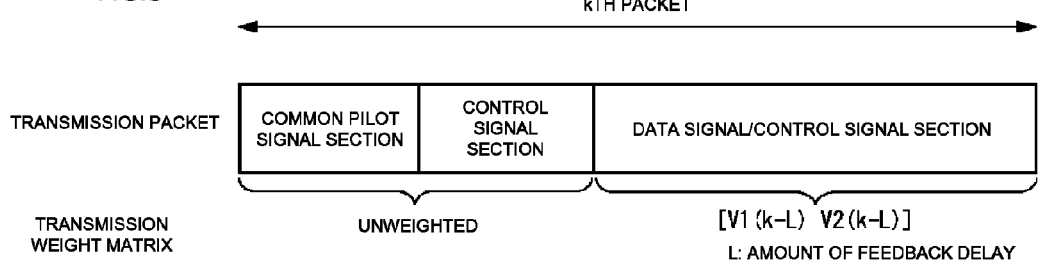
FIG. 8 is a diagram illustrating a frame configuration of a pilot signal according to the second embodiment.

FIG. 8 illustrates an example of a frame configuration of a pilot signal to be transmitted from a base station when common and dedicated pilot signals are multiplexed using TDM. The frame includes a common pilot signal section, a control signal section, and a data signal/control signal section. The common pilot signal is multiplexed using any of FDM, TDM, and CDM or a combination thereof for each of a plurality of antennas. Accordingly, the terminal device 60a separates and receives the common pilot signals and performs channel estimation per antenna or per weight. A portion of the control signal section is transmitted without weighting by a transmission weight. Accordingly, the control signal can be demodulated using a channel estimate obtained from the common pilot signal.

Next, the terminal device 60a according to the second embodiment will be described. As illustrated in FIG. 7, while the basic configuration of the terminal device 60a according to the second embodiment is the same as the basic configuration of the terminal device 60 according to the first embodiment, a transmission interference cancellation coefficient data/transmission weighting data extractor 96 and a channel estimate modifier 98 are provided in place of the dedicated pilot signal extractor 86 and the second channel estimator 88.

The transmission interference cancellation coefficient data/transmission weighting data extractor 96 extracts the transmission interference cancellation coefficient data $\alpha(k-L)^{(m1)}$ and the transmission weighting data ($V1^{(m1)}$, $V2^{(m1)}$) transmitted from the base station device 10a.

With respect to a channel estimate $H(m_s)$ obtained by the first channel estimator 68, the channel estimate modifier 98 calculates a second channel estimate $Z(m_s)$ that is a channel estimate modified based on data from the transmission interference cancellation coefficient data/transmission weighting data extractor 96. The second channel estimate $Z(m_s)$ may be given by expression (11) below.

[Expression 11]

$$Z(m_s)=[H(m_s)V_1^{(m1)}H(m_s)(V_2^{(m1)}-\alpha(k-L)V_1^{(m1)})] \quad (11)$$

Figure 9:
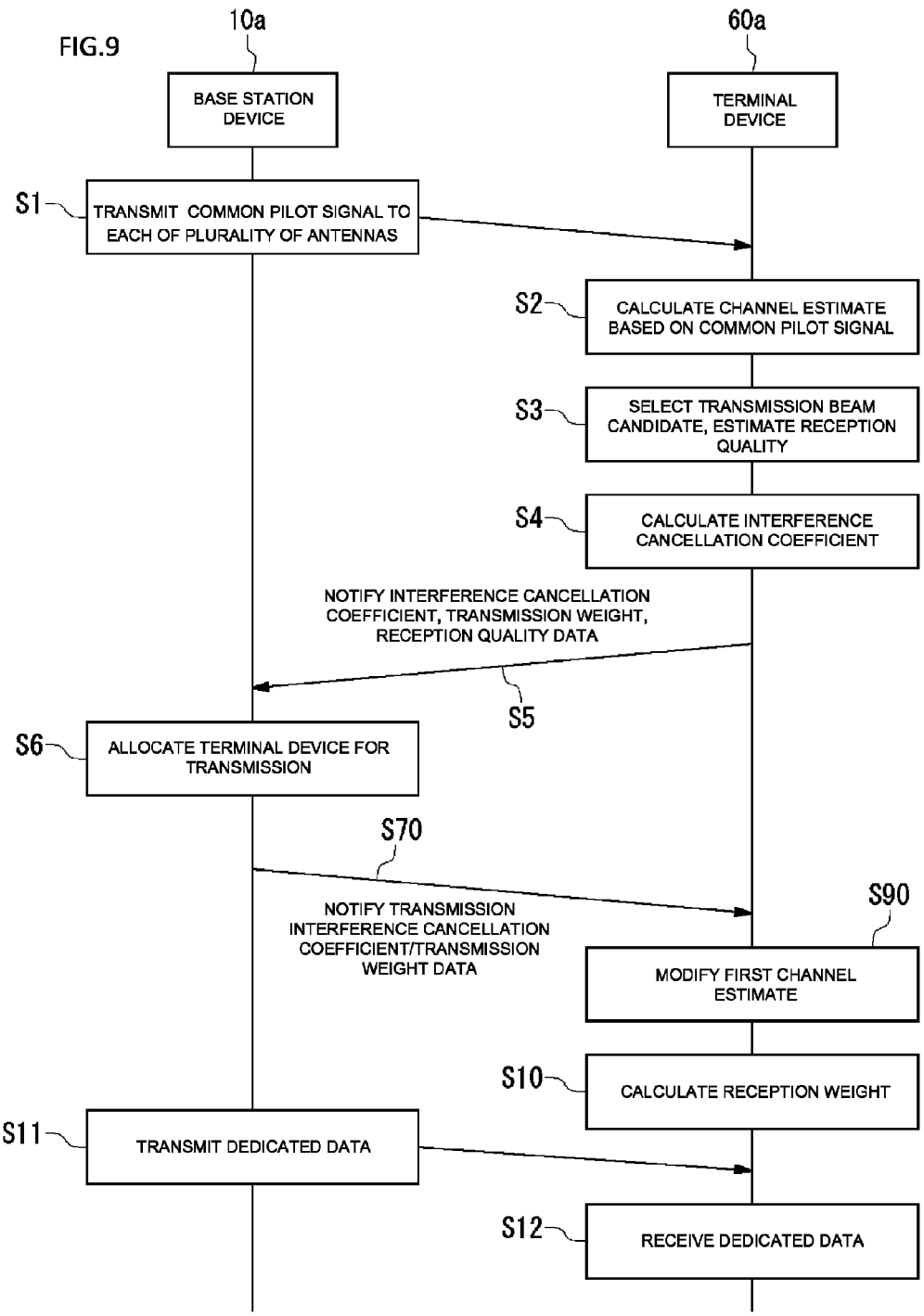
FIG. 9 is a diagram illustrating operations of a wireless communication system according to the second embodiment.

FIG. 9 is a flow chart illustrating operations of the wireless communication system according to the second embodiment. While basic operations of the wireless communication system according to the second embodiment is the same as the basic operations of the wireless communication system according to the first embodiment, a difference is that after terminal devices 60a to be spatially multiplexed are determined by a resource allocator 46, a process is performed for notifying the terminal devices 60a that dedicated data transmission is to be performed (step S70).

The wireless communication system according to the second embodiment is capable of transmitting transmission interference cancellation coefficient data and transmission weighting data as a control signal to terminal devices 60a to be spatially multiplexed and notifying information related to a propagation channel that fluctuates when interference cancellation and transmission weight multiplication are performed in advance at a base station device to other terminal devices 60a to be spatially multiplexed. Therefore, the same advantageous effects as the first embodiment can be achieved.

In addition, since the terminal device 60a according to the second embodiment no longer requires a second channel estimator, there is an advantage that the terminal device 60*a* can be configured in a simpler manner.

Third Embodiment

Figure 10:
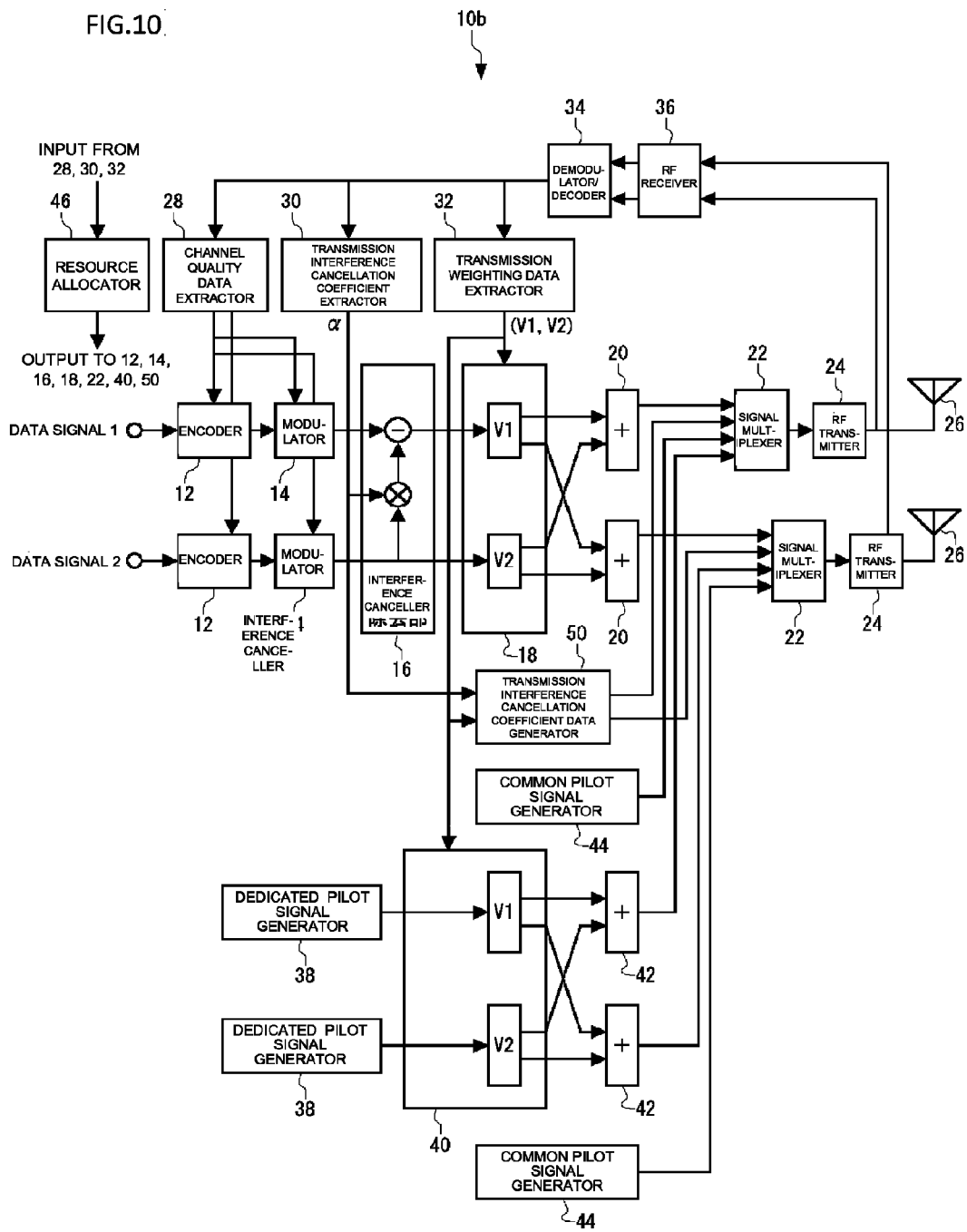
FIG. 10 is a diagram illustrating a configuration of a base station device according to a third embodiment.
Figure 11:
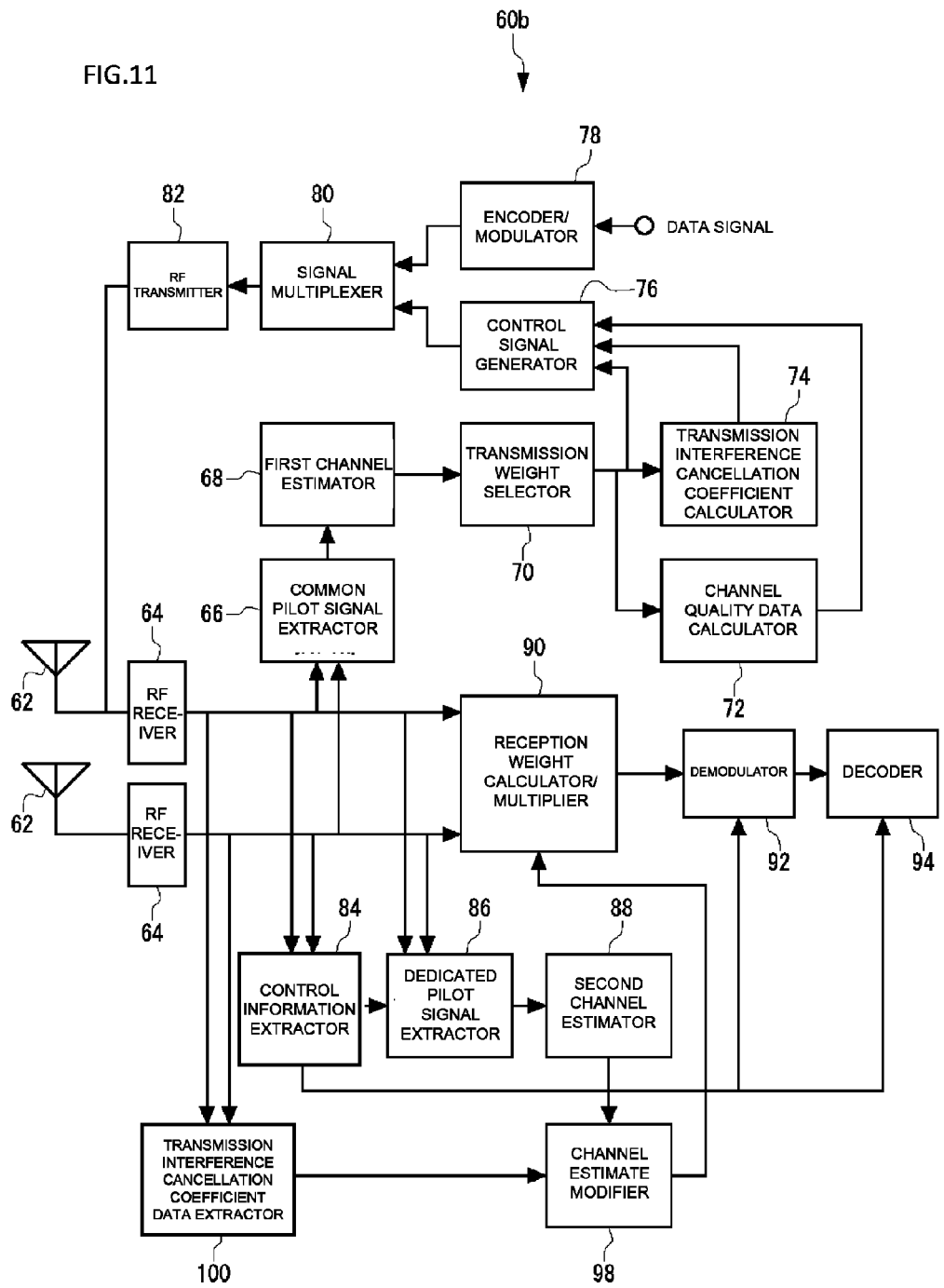
FIG. 11 is a diagram illustrating a configuration of a terminal device according to the third embodiment.

FIG. 10 is a diagram illustrating a configuration of a base station device 10*b* according to a third embodiment, and FIG. 11 is a diagram illustrating a configuration of a terminal device 60*b* according to the third embodiment. Hereinafter, a wireless communication system according to the third embodiment will be described with reference to FIGS. 10 and 11.

While the basic configuration of the base station device 10*b* according to the third embodiment is the same as the basic configuration of the base station device 10 according to the first embodiment, the base station device 10*b* according to the third embodiment includes a transmission interference cancellation coefficient data generator 50 in addition to the configuration of the base station device 10 according to the first embodiment.

The transmission interference cancellation coefficient data generator 50 generates a control signal series for notifying transmission interference cancellation coefficient data $\alpha(k-L)^{(m1)}$. The transmission interference cancellation coefficient data generator 50 inputs the generated control signal series to a signal multiplexer 22. The signal multiplexer 22 multiplexes a common pilot signal series $y_p(k)$, a dedicated pilot signal series, the control signal series, and a data signal series $y_g(k)$ using any of FDM, TDM, and CDM or a combination thereof to generate and output a signal having a predetermined frame configuration.

In FIG. 10, output signals from a channel quality data extractor 28, a transmission interference cancellation coefficient extractor 30, and a transmission weighting data extractor 32 are inputted to a resource allocator 46. The resource allocator 46 outputs a resource allocation signal including a combination of terminal devices 60 to be spatially multiplexed, a frequency, a time, a code, and the like to an encoder 12, a modulator 14, an interference canceller 16, a first transmission weight multiplier 18, a second transmission weight multiplier 40, the signal multiplexer 22, and the transmission interference cancellation coefficient data generator 50.

Figure 12:
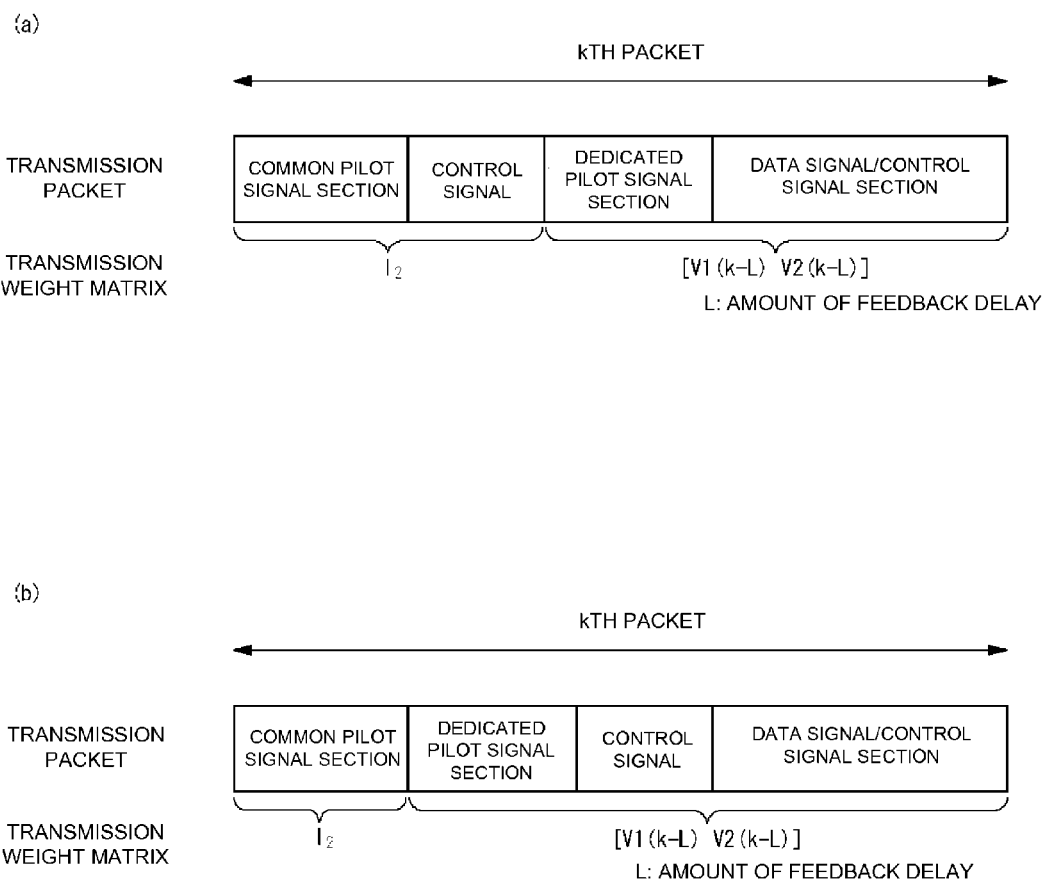
FIG. 12A is a diagram illustrating a frame configuration of a pilot signal according to the third embodiment.
FIG. 12B is a diagram illustrating another example of the frame configuration of a pilot signal.

FIG. 12A illustrates an example of a frame configuration of a pilot signal to be transmitted from the base station device 10*b*. In the example illustrated in FIG. 12A, a common pilot signal and a dedicated pilot signal are multiplexed using TDM. A frame of the pilot signal includes a common pilot signal section, a dedicated pilot signal section, a control signal section, and a data signal/control signal section. The common pilot signal is multiplexed using any of FDM, TDM, and CDM or a combination thereof for each of a plurality of antennas. In the example illustrated in FIG. 12A, the control signal section is not multiplied by a transmission weight. Accordingly, the terminal device 60*b* is now capable of demodulating the control signal using a channel estimate obtained from the common pilot signal.

Moreover, a configuration of a frame that multiplexes a common pilot signal and a dedicated pilot signal is not limited to the example illustrated in FIG. 12A. As is the case with the example illustrated in FIG. 12B, the control signal section can be multiplied by the same transmission weight used for the dedicated pilot signal. Accordingly, the terminal device 60*b* is now capable of demodulating the control signal using a channel estimate obtained from the dedicated pilot signal. Since the example illustrated in FIG. 12B transmits a dedicated pilot signal using a transmission weight that improves reception quality, channel estimation accuracy can be improved.

A configuration of the terminal device 60*b* will be described with reference to FIG. 11. While the basic configuration of the terminal device 60*b* according to the third embodiment is the same as the basic configuration of the terminal device 60*a* according to the second embodiment, the terminal device 60*b* according to the third embodiment includes a transmission interference cancellation coefficient data extractor 100 in place of the transmission interference cancellation coefficient data/transmission weighting data extractor 96. The transmission interference cancellation coefficient data extractor 100 functions to extract transmission interference cancellation coefficient data $\alpha(k-L)^{(m1)}$ transmitted from the base station device 10*b*.

Figure 13:
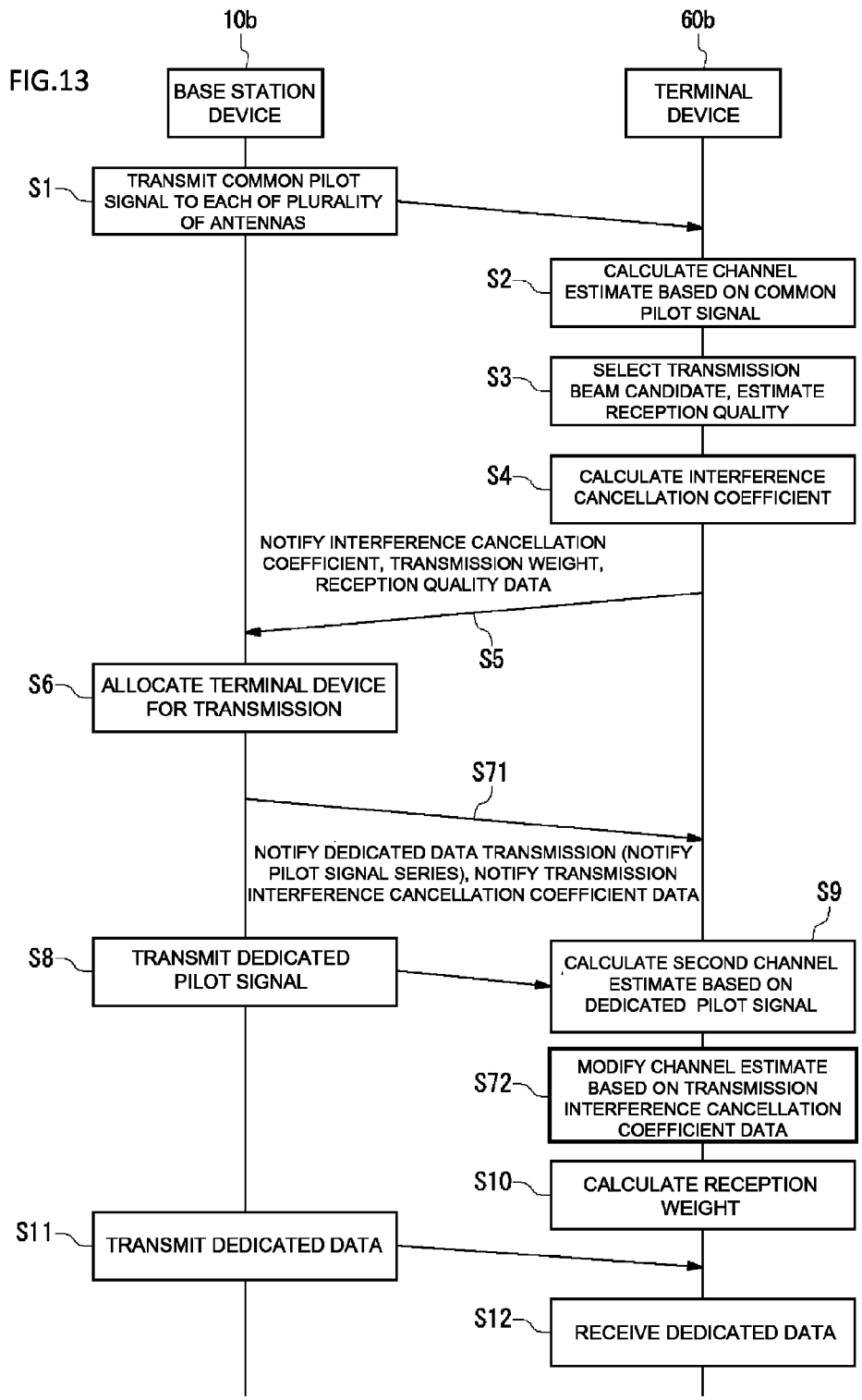
FIG. 13 is a diagram illustrating operations of a wireless communication system according to the third embodiment.

FIG. 13 is a flow chart illustrating operations of the wireless communication system according to the third embodiment. While basic operations of the wireless communication system according to the third embodiment is the same as the basic operations of the wireless communication system according to the first embodiment, a difference is that after terminal devices 60*b* to be spatially multiplexed are determined by the resource allocator 46, a notification is made to the terminal devices 60*b* that dedicated data transmission is to be performed (step S71).

Subsequently, the transmission interference cancellation coefficient data generator 50 of the base station device 10*b* generates a control signal series of the transmission interference cancellation coefficient data $\alpha(k-L)^{(m1)}$ with respect to a combination of terminal devices 60*b* to be spatially multiplexed as determined by the resource allocator 46, and inputs the generated control signal series to a signal multiplexer 22.

The second transmission weight multiplier 40 of the base station device 10*b* inputs a dedicated pilot signal obtained by multiplying a dedicated pilot signal series $q_s(k)$ by a weight based on determined transmission weighting data ($V1^{(m1)}$, $V2^{(m1)}$) as given by the expression below to the signal multiplexer 22. In other words, a signal is generated by multiplying an sth dedicated pilot signal series $q_s(k)$ by a transmission weight expressed below. Note that the following expression (12) represents a case where s=1, 2. In addition, $y_q$ denotes a column vector including an Nt-dimensional element.

[Expression 12]

$$y_q(k) = [V_1^{(m1)} \quad V_2^{(m1)}] \begin{bmatrix} q_1(k) \\ q_2(k) \end{bmatrix} \quad (12)$$

The signal multiplexer 22 multiplexes a common pilot signal series $y_p(k)$, the dedicated pilot signal series $y_q(k)$, a control signal series, and a data signal series $y_g(k)$ using any of FDM, TDM, and CDM or a combination thereof to generate and output a signal having a predetermined frame configuration (step S8).

The terminal device 60*b* having received the dedicated pilot signal from the base station device 10*b* causes the transmission interference cancellation coefficient data extractor 100 to extract transmission interference cancellation coefficient data $\alpha(k-L)^{(m1)}$ transmitted from the base station device 10*b*. Subsequently, with respect to a second channel estimate $Z(m_s)$ obtained by a second channel estimator 88, the channel estimate modifier 98 of the terminal device 60*b* calculates a second channel estimate $Z(m_s)$ modified as given by expression (13) below based on data from the transmission interference cancellation coefficient data extractor 100. Note that the following expression (13) represents a channel estimate $Z(m_s)$ where s=1, 2. In addition, $Z_s(x)$ denotes an sth column vector of a matrix $Z(x)$.

[Expression 13]

$$[Z_1(m_s)Z_2(m_s)-\alpha(k-L)Z_1(m_s))]=H(m_s)[V_1\{V_2-\alpha(k-L)V_1\}] \quad (13)$$

In the present embodiment, the base station device 10b transmits only transmission interference cancellation coefficient data α as a control signal to a terminal device 60b to be spatially multiplexed. Accordingly, information related to a propagation channel that fluctuates when interference cancellation is performed in advance at the base station device 10b can be notified to other terminal devices 60b to be spatially multiplexed. Consequently, the amount of control information can be reduced in comparison to the wireless communication system according to the second embodiment. In addition, since the base station device 10b transmits a dedicated pilot signal to the terminal device 60b using a transmission weight that improves reception quality, channel estimation accuracy can be improved.

Fourth Embodiment

Next, a wireless communication system according to a fourth embodiment will be described. While a basic configuration the wireless communication system according to the fourth embodiment is the same as the basic configuration of the wireless communication system according to the first embodiment, for the fourth embodiment, an example will be described in which the present invention is applied to multi-carrier transmission such as OFDM or OFDMA.

Figure 14:
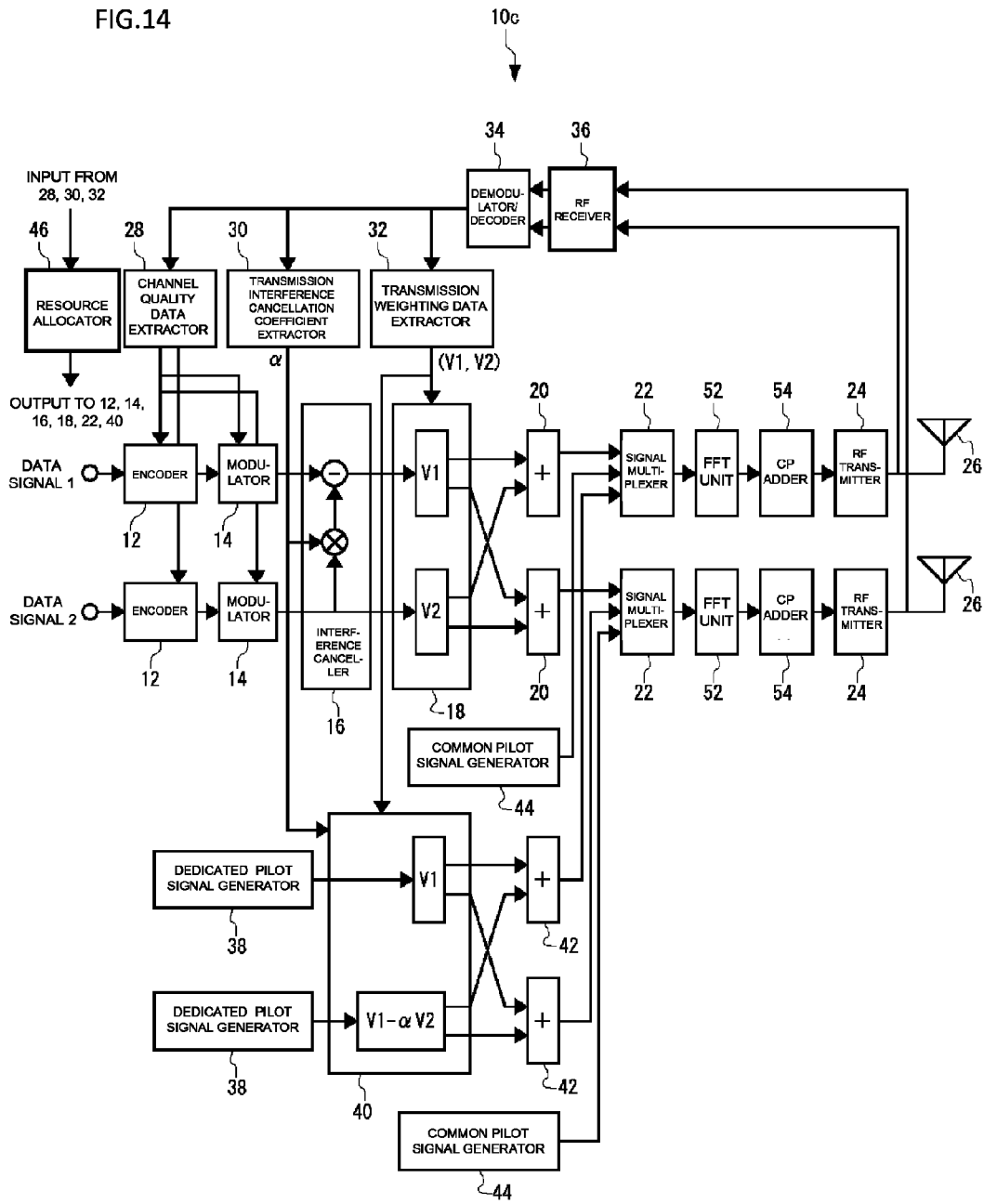
FIG. 14 is a diagram illustrating a configuration of a base station device according to a fourth embodiment.

FIG. 14 is a diagram illustrating a configuration of a base station device 10c according to the fourth embodiment. The base station device 10c according to the fourth embodiment comprises an FFT unit 52 and a CP adder 54 in addition to the configuration of the base station device 10 according to the first embodiment. The FFT unit 52 performs FFT processing on an inputted subcarrier signal fd. The CP adder 54 adds a cyclic prefix.

In FIG. 14, output signals from a channel quality data extractor 28, a transmission interference cancellation coefficient extractor 30, and a transmission weighting data extractor 32 are inputted to a resource allocator 46. The resource allocator 46 outputs a resource allocation signal including a combination of terminal devices 60 to be spatially multiplexed, a frequency, a time, a code, and the like to an encoder 12, a modulator 14, an interference canceller 16, a first transmission weight multiplier 18, a second transmission weight multiplier 40, and a signal multiplexer 22.

Figure 15:
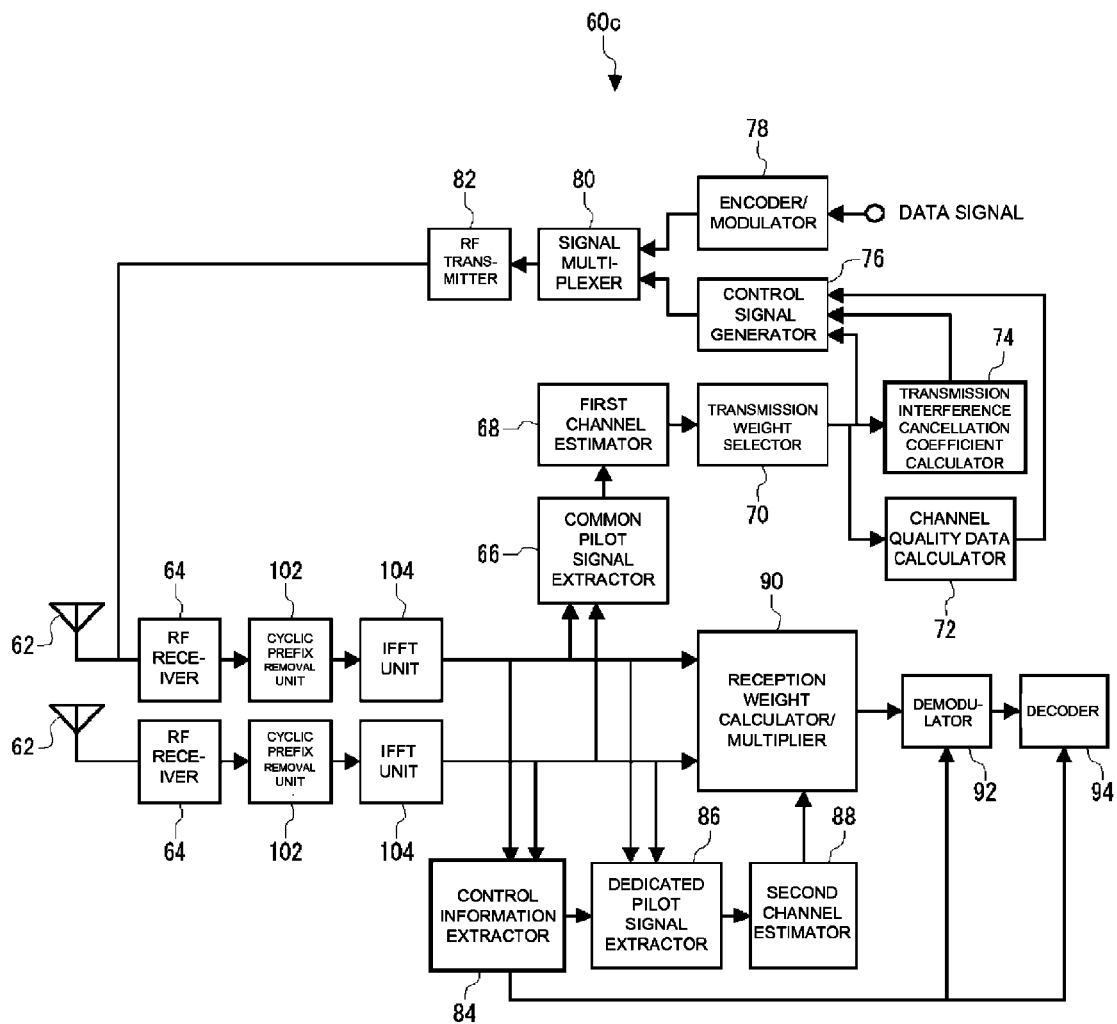
FIG. 15 is a diagram illustrating a configuration of a terminal device according to the fourth embodiment.

FIG. 15 is a diagram illustrating a configuration of a terminal device 60c according to the fourth embodiment. The terminal device 60c according to the fourth embodiment comprises a cyclic prefix removal Unit 102 and an IFFT unit 104 in addition to the configuration of the terminal device 60 according to the first embodiment. The cyclic prefix removal Unit 102 and the IFFT unit 104 perform OFDM modulation. The configurations enable an inputted time domain signal to be converted to a frequency-domain subcarrier signal.

Hereinafter, operations of the wireless communication system according to the fourth embodiment will be described. Since basic operations of the wireless communication system according to the fourth embodiment is the same as the basic operations of the wireless communication system according to the first embodiment, a description will be given with reference to FIG. 5.

An nth common pilot signal generator 44 of the base station device 10c generates a common pilot signal series $p_n(k, f_d)$ as given by the following expression, and transmits the generated common pilot signal. In expression (14) below, n denotes a natural number equal to or smaller than the number of transmitting antennas Nt and k denotes a discrete time. The common pilot signal series $p_n(k, f_d)$ is inputted to the signal multiplexer 22 without being multiplied by a transmission weight (step S1). In expression (14) below, $f_d$ denotes an index of a subcarrier signal and has a range of fd=1~$N_{sc}$, where $N_{sc}$ denotes the number of subcarriers.

[Expression 14]

$$y_p(k, f_d) = \begin{bmatrix} p_1(k, f_d) \\ \vdots \\ p_{Nt}(k, f_d) \end{bmatrix} \quad (14)$$

The terminal device 60c having received the common pilot signal causes a first channel estimator 68 to perform channel estimation for each subcarrier based on reception results of the common pilot signal $y_p(k, f_d)$ transmitted from the base station device 10c (step S2). A channel estimation result (hereinafter referred to as a "channel estimate") obtained as described above can be expressed by the following matrix.

[Expression 15]

$$H(m, f_d) = \begin{bmatrix} h^m(1,1,f_d) & h^m(1,2,f_d) & \ldots & h^m(1,N_t,f_d) \\ h^m(2,1,f_d) & h^m(2,2,f_d) & \ldots & h^m(2,N_t,f_d) \\ \vdots & \vdots & \vdots & \vdots \\ h^m(N_s(m),1,f_d) & h^m(N_s(m),2,f_d) & \ldots & h^m(N_s(m),N_t,f_d) \end{bmatrix} \quad (15)$$

When an amount of multipath delay of a propagation path is within a CP length, a flat fading environment can be assumed. Accordingly, the total number of channel estimates at an mth terminal device 60c-m can be expressed as ($N_t$: number of common pilot signal series)×($N_s$(m): number of receiving antennas of terminal device 60c-m). Here, $h^m(j_2, j_1, f_d)$ denotes a channel estimate when the terminal device 60c-m receives a $j_1$th common pilot signal series with a $j_2$th antenna with respect to an $f_d$th subcarrier signal.

A transmission weight selector 70 selects specific transmission weights ($V1(f_d)$, $V2(f_d)$) according to the selection criteria described below from a fixed transmission weight group $u_n$ that is mutually known between the base station device 10c and the terminal device 60c for each subcarrier $f_d$, and further estimates a reception quality based on a maximum SNR in the event that a data signal is transmitted using the selected transmission weight $V1(f_d)$ (step S3). In addition, as an alternative method, a reception quality based on an SINR using a maximum SNR obtained by a maximum SNR criterion and a minimum SNR obtained by a minimum SNR criterion may be estimated. An SINR is calculated as, for example, (maximum SNR/minimum SNR).

A transmission weight selection method will be given below. Here, n denotes a natural number equal to or smaller than a maximum number of fixed transmission weight candidates. As a maximum SNR criterion, a fixed transmission weight $V1(f_d)$ that provides a maximum SNR is selected using a channel estimate $H(m, f_d)$ result.

[Expression 16]

$$V1(f_d) = \left\{ u_n \,\middle|\, \max_n \|H(m, f_d)u_n\|^2 \right\} \quad (16)$$

In addition, as a minimum SNR criterion, a fixed transmission weight V2 that provides a minimum SNR is selected using the channel estimate H(m, $f_d$) result.

[Expression 17]

$$V2(f_d) = \left\{ u_n \,\middle|\, \max_n \|H(m, f_d)u_n\|^2 \right\} \quad (17)$$

Moreover, notification of a transmission weight selection result is performed by any of: (1) sending index data of a selection result of two kinds of transmission weights (V1($f_d$), V2($f_d$)); (2) sending index data of a two-dimensional table (x, y) that combines two kinds of transmission weights; and (3) sending index data of a table restricted to a portion of combinations of a two-dimensional table that combines two kinds of transmission weights (for example, a table is used limited to combinations of weights by excluding weights adjacent to each other in a main weighting direction). In the case of the third method, search candidates of transmission weights to be selected by the minimum SNR criterion can be searched from a subset of limited transmission weight combinations, enabling a reduction in computation quantity.

A transmission interference cancellation coefficient calculator 74 of the terminal device 60c calculates an interference cancellation coefficient $\alpha^{(m)}(f_d)$ such as provided below for each subcarrier $f_d$ (step S4). The transmission interference cancellation coefficient calculator 74 transmits the interference cancellation coefficient $\alpha^{(m)}(f_d)$ to: another terminal device 60c to be spatially multiplexed using the transmission weight V2($f_d$); and to a terminal device 60c of the same base station using the transmission weight V1($f_d$). In addition, at the receiving side, an interference cancellation coefficient $\alpha^{(m)}(f_d)$ is calculated on the assumption that reception is to be performed using a maximum ratio combining weight.

[Expression 18]

$$\alpha^{(m)}(f_d) = \frac{(H(m, f_d)V_1^{(m)}(f_d))^H H(m, f_d)V_2^{(m)}(f_d)}{\|H(m, f_d)V_1^{(m)}(f_d)\|^2} \quad (18)$$

By using such an interference cancellation coefficient $\alpha^{(m)}(f_d)$, a property improvement effect due to DPC as is conventional can be obtained for one terminal device 60c-m among terminal devices 60c to be spatially multiplexed under an ideal condition realized when there are no errors in the channel estimate H(m, $f_d$) and fluctuations do not occur. In addition, the interference cancellation coefficient can be calculated as a single complex number coefficient that does not depend on the number of transmitting antennas Nt of the base station device 10c and the number of receiving antennas Ns(m) of the terminal device 60c. In other words, even when the number of transmitting antennas Nt and the number of receiving antennas Ns are large, the amount of information to be notified to the base station device 10c remains the same. Therefore, a significant reduction effect on the amount of information to be fed back to the base station device 10c can be obtained particularly when the number of transmitting antennas Nt or the number of receiving antennas Ns is large.

A control signal generator 76 generates a control signal for feeding back interference cancellation coefficient data, channel reception quality data, and selected transmission weighting data for each subcarrier $f_d$ to the base station device 10c.

A signal multiplexer 80 multiplexes an output signal from an encoder/modulator 78 that is an encoded and modulated data signal with an output signal from the control signal generator 76. In this case, the signal multiplexer 80 uses any of FDM, TDM, CDM or a multiplexing method that is a combination thereof.

The terminal device 60c transmits a control signal generated through multiplexing to the base station device 10c (step S5). Upon receiving the control signal transmitted from the terminal device 60c, the base station device 10c causes the transmission weighting data extractor 32 to extract transmission weighting data V1(k–L, $f_d$)$^{(m)}$ and V2(k–L, $f_d$)$^{(m)}$ transmitted from an mth terminal device 60c-m from the reception signal. In this case, the transmission weighting data V1 and V2 is transmission weights selected by a maximum SNR criterion and a minimum SNR criterion at the terminal device 60c-m, where m takes a natural number equal to or smaller than the number Nms of terminal devices existing within an area of the base station device. The channel quality data extractor 28 extracts channel quality data Q(m, $f_d$) transmitted from the terminal device 60c-m from the reception signal. The transmission interference cancellation coefficient extractor 30 extracts transmission interference cancellation coefficient data $\alpha$(k–L, $f_d$)$^{(m)}$ transmitted from the terminal device 60c-m from the reception signal, where k represents a discrete time and (k–L) represents a period in which a transmission weight or an interference cancellation coefficient had been measured by the terminal device 60c-m. In other words, transmission weighting data and interference cancellation coefficient data are obtained at time k based on a propagation path status before a discrete time L.

The resource allocator 46 determines a combination of terminal devices to be spatially multiplexed based on transmission weighting data (V1$^{(m)}$($f_d$), V2$^{(m)}$($f_d$)) and reception quality data Q(m, $f_d$) per subcarrier outputted from the plurality of terminal devices 60, and allocates resources such as a frequency, a time, a sign, and the like (step S6). In this case, a combination of terminal devices to be spatially multiplexed is determined such that with respect to a terminal device 60-m1, a transmission weight V2$^{(m1)}$ selected by a minimum SNR criterion with respect to another terminal device 60-m2 to be simultaneously multiplexed becomes equal to a transmission weight V1$^{(m2)}$ selected by a maximum SNR criterion. In other words, terminal devices such that V2$^{(m1)}$=V1$^{(m2)}$ are combined. At this point, the relationship of V2$^{(m2)}$=V1$^{(m1)}$ need not necessarily be true. Due to such a method, a combination that increases directional gain while reducing radiant interference and an interfered amount between terminal devices to be simultaneously multiplexed can be realized.

After a combination (60c-m1, 60c-m2) of terminal devices to be spatially multiplexed for each subcarrier has been determined by the resource allocator 46, a transmission weight that maximizes SNR for each terminal device 60c-m1, 60c-m2 is set to (V1$^{(m1)}$($f_d$), V1$^{(m2)}$($f_d$)) to be used for transmitting a data signal. In addition, in this case, with respect to the terminal device 60-m1, the transmission weight equals a combination (V1$^{(m1)}$($f_d$), V2$^{(m1)}$($f_d$)) of transmission weights that maximizes SINR.

Next, after terminal devices 60c to be spatially multiplexed with respect to a subcarrier has been determined by the resource allocator 46, a notification that dedicated data transmission is to be performed together with information on the subcarrier to be used is made to the terminal devices 60c (step S7). In doing so, control information including MCS data and transmission power data during data transmission is to be transmitted as a control signal (step S7). Moreover, when transmission power during data transmission in spatial multiplex transmission is equal to transmission power during transmission of a dedicated pilot signal, transmission power data on the dedicated data signal need not be included in control information. In addition, as an alternative method, when sending a dedicated data signal at a different transmission power than the dedicated pilot signal, control information including transmission power data is to be transmitted from the base station device 10c to the terminal device 60c.

Upon receiving a control signal for dedicated data transmission notification transmitted from the base station device 10c, the terminal device 60c causes the control information extractor 84 to extract control information including resource allocation data, dedicated pilot signal series data, channel quality data for each subcarrier when performing data transmission (MCS data), and power transmission data from the control signal. In this case, dedicated pilot signal series data includes information on a dedicated pilot signal series by which a desired data signal is to be transmitted. In other words, information is included indicating which of the transmission weights V1 or V2 is used for transmission.

The second transmission weight multiplier 40 of the base station device 10c outputs a dedicated pilot signal obtained as given by expression (19) below by multiplying a dedicated pilot signal series $q_s(k, f_d)$ by a weight based on transmission weighting data ($V1^{(m1)}(f_d)$, $V2^{(m1)}(f_d)$) and transmission interference cancellation coefficient data $\alpha(k-L, f_d)^{(m1)}$ determined for each subcarrier $f_d$ (step S8). Note that the expression (19) represents a case where s=1, 2. In addition, $y_q$ denotes a column vector including an Nt-dimensional element.

[Expression 19]

$$y_q(k, f_d) = [V_1(f_d) \quad \{V_2(f_d) - \alpha(k-L, f_d)V_1(f_d)\}] \begin{bmatrix} q_1(k, f_d) \\ q_2(k, f_d) \end{bmatrix} \quad (19)$$

A second channel estimator 88 performs channel estimation for each subcarrier based on a reception result of a dedicated pilot signal $y_q(k, f_d)$ transmitted from the base station device 10c (step S9). The channel estimation result obtained at this point may be expressed using a matrix $Z(m, f_d)$ as given by expression (20) below (hereinafter, this matrix shall be referred to as a "second channel estimation matrix).

[Expression 20]

$$Z(m, f_d) = \begin{bmatrix} z^m(1, 1, f_d) & z^m(1, 2, f_d) \\ z^m(2, 1, f_d) & z^m(2, 2, f_d) \\ \vdots & \vdots \\ z^m(N_s(m), 1, f_d) & z^m(N_s(m), 2, f_d) \end{bmatrix} \quad (20)$$
$$= H(m_s, f_d)[V_1(f_d) \quad \{V_2(f_d) - \alpha(k-L, f_d)V_1(f_d)\}]$$

When an amount of multipath delay of a propagation path is within a CP length, a flat fading environment can be assumed. Accordingly, the total number of channel estimates of an $f_d$th subcarrier signal at an mth terminal device 60c-m can be expressed as (Nb: number of dedicated pilot signal series transmitted from base station)×($N_s(m)$: number of receiving antennas of terminal device 60c-m). In expression (20), $z^m(j, s, f_d)$ denotes a channel estimate of the $f_d$th subcarrier signal when the terminal device 60c-m receives an sth dedicated pilot signal series with a jth antenna. In addition, the above expression represents a second channel estimation matrix $Z(m, f_d)$ for Nb=2.

A reception weight calculator/multiplier 90 uses the second channel estimation matrix estimated by the second channel estimator 88 for each subcarrier to calculate a reception weight, and multiplies an output signal of the RF receiver 64 by the reception weight (step S10). In this case, a reception weight is calculated based on a ZF criterion, an MMSE criterion, or the like. With a ZF criterion, an inverse matrix $Z^{-1}(m, f_d)$ of the second channel estimation matrix $Z(m, f_d)$ is calculated, and when a desired data signal is to be transmitted by a transmission signal of Vs according to dedicated pilot signal series data, a row vector comprising an sth row of the inverse matrix $Z^{-1}(m, f_d)$ is to be used as a reception weight. Accordingly, even when an error is included in the channel estimate $H(m, f_d)$, an interference signal to a terminal device to be spatially multiplexed can be cancelled.

Each data signal to be transmitted to the terminal devices 60-m1 and 60-m2 is processed by the encoder 12, the modulator 14, the interference canceller 16, and the first transmission weight multiplier 18, and outputted to the signal multiplexer 22. In this case, the following process is performed at the interference canceller 16 and the first transmission weight multiplier 18 (step S11). Based on the transmission interference cancellation coefficient data $\alpha(k-L, f_d)$, the interference canceller performs interference cancellation so as to reduce interference between terminal devices to be spatially multiplexed. In other words, after performing interference cancellation as given by expression (21) below on a data signal series $d_s(k, f_d)$ addressed to an sth terminal device, a data signal $g_s(k, f_d)$ is transmitted. Note that the expression (21) represents a case where s=1, 2.

[Expression 21]

$$\begin{bmatrix} g_1(k, f_d) \\ g_2(k, f_d) \end{bmatrix} = \begin{bmatrix} d_1(k, f_d) - \alpha(k-L, f_d)d_2(k, f_d) \\ d_2(k, f_d) \end{bmatrix} \quad (21)$$

Next, based on extracted transmission weighting data (V1$(f_d)$, V2$(f_d)$), the first transmission weight multiplier 18 multiplies the data signal (including a user-individual control signal) to be transmitted to the terminal devices 60c-m1 and 60c-m2 by a transmission weight. A signal $y_g(g, f_d)$ is generated by multiplying the signal series $g_s(k, f_d)$ outputted from the interference canceller 16 by a transmission weight, where denotes a natural number equal to or lower than the number of users connected by spatial multiplexing. A signal $y_g(g, f_d)$ for signal series s=2 may be given by expression (22) below, where V1, V2, and $y_g$ represent column vectors including Nt-dimensional elements.

[Expression 22]

$$y_g(k, f_d) = [V_1(k-L, f_d) \quad V_2(k-L, f_d)] \begin{bmatrix} g_1(k, f_d) \\ g_2(k, f_d) \end{bmatrix} \quad (22)$$

The signal multiplexer 22 multiplexes a common pilot signal series $y_p(k, f_d)$, a dedicated pilot signal series $y_g(k, f_d)$, and the data signal series $y_g(k, f_d)$ using any of FDM, TDM, and CDM or a combination thereof to generate and output a signal having a predetermined frame configuration.

Subsequently, the FFT unit 52 and the CP adder 54 perform OFDM modulation. In other words, the FFT unit 52 performs FFT processing on an inputted subcarrier signal $f_d$. The CP adder 54 adds a cyclic prefix.

A demodulator 92 and a decoder 94 perform a demodulating operation and a decoding operation on an output of the reception weight calculator/multiplier 90 (step S12).

According to the present embodiment described above, when there are no error fluctuations in a result of the channel estimation matrix obtained by the first channel estimator 68 and in a propagation channel at a time of data signal transmission, as given by expression (23) below, a data signal $d_1(k)$ to be transmitted to the terminal device 60c-m1 can now be received using a maximum ratio combining reception weight $w_1(f_d)=[H(m_1, f_d)V_1(k-L, f_d)]^H$ without being affected by a same-channel interference signal from a terminal device 60c-m2 to be spatially multiplexed, where the superscript H denotes a complex conjugate operator.

[Expression 23]

$$w_1(f_d)H(m_1, f_d)y_g(k, f_d) = \begin{bmatrix} H(m_1, f_d) \\ V_1(k-L, f_d) \end{bmatrix}^H \quad (23)$$

$$H(m_1, f_d)\begin{bmatrix} V_1(k-L, f_d) \\ V_2(k-L, f_d) \end{bmatrix}\begin{bmatrix} g_1(k, f_d) \\ g_2(k, f_d) \end{bmatrix}$$

$$= \|H(m_1, f_d)V_1(k-L, f_d)\|^2 d_1(k, f_d)$$

In addition, a result of a channel estimation matrix $H(m_s, f_d)$ obtained by the first channel estimator 68 with respect to a subcarrier $f_d$ of the terminal device 60c-$m_s$ and a reception signal $r_s(k, f_d)$ when a propagation channel at the time of data signal transmission include error fluctuations may be given by the following expression (24). The expression (24) represents a case where s=1, 2. In this case, by calculating a reception weight using the channel estimate $Z(m_s, f_d)$ obtained by the second channel estimator 88, the data signal $d_x(k, f_d)$ to be transmitted to the terminal device 60c-$m_s$ can be received without being affected by a same-channel interference signal from another terminal device to be spatially multiplexed.

[Expression 24]

$$r_s(k, f_d) = H(m_s, f_d)V_1(f_d)\begin{bmatrix} d_1(k, f_d) - \\ \alpha(k-L, f_d)d_2(k, f_d) \end{bmatrix} + \quad (24)$$

$$H(m_s, f_d)V_2(f_d)d_2(k, f_d)$$

$$= H(m_s, f_d)\begin{bmatrix} V_1(f_d) \begin{Bmatrix} V_2(f_d) - \\ \alpha(k-L, f_d)V_1(f_d) \end{Bmatrix} \end{bmatrix}\begin{bmatrix} d_1(k, f_d) \\ d_1(k, f_d) \end{bmatrix}$$

As described above in the fourth embodiment, the configuration according to the first embodiment can also be applied to multi-carrier transmission such as OFDM and OFDMA. In this case, by applying operations according to the present embodiment to each of a plurality of subcarriers or to a subband that consolidates a plurality of subcarriers, the same advantageous effect as the first embodiment can be achieved.

In addition, the configurations according to the second and third embodiments can similarly be applied to multi-carrier transmission such as OFDM and OFDMA. In such cases, by similarly applying operations according to the present embodiment to each of a plurality of subcarriers or to a subband that consolidates a plurality of subcarriers, the same advantageous effect as the second and third embodiments can be achieved.

Fifth Embodiment

The description of the first embodiment given above mainly focused on operations performed when respectively transmitting dedicated data signals to be unicasted to a plurality of different terminal devices using spatial multiplexing. In the present embodiment, a wireless communication system will be described in greater detail with respect to a case where the wireless communication system is applied to the spatial multiplexing of an MBS (multicast and broadcast service) data signal (hereinafter referred to as a multicast signal) that is multicasted or broadcasted to transmit the same data to a limited plurality of terminals and a dedicated data signal that is unicast-transmitted to a specific terminal device. The following description will mainly focus on differences from the first embodiment.

Figure 16:
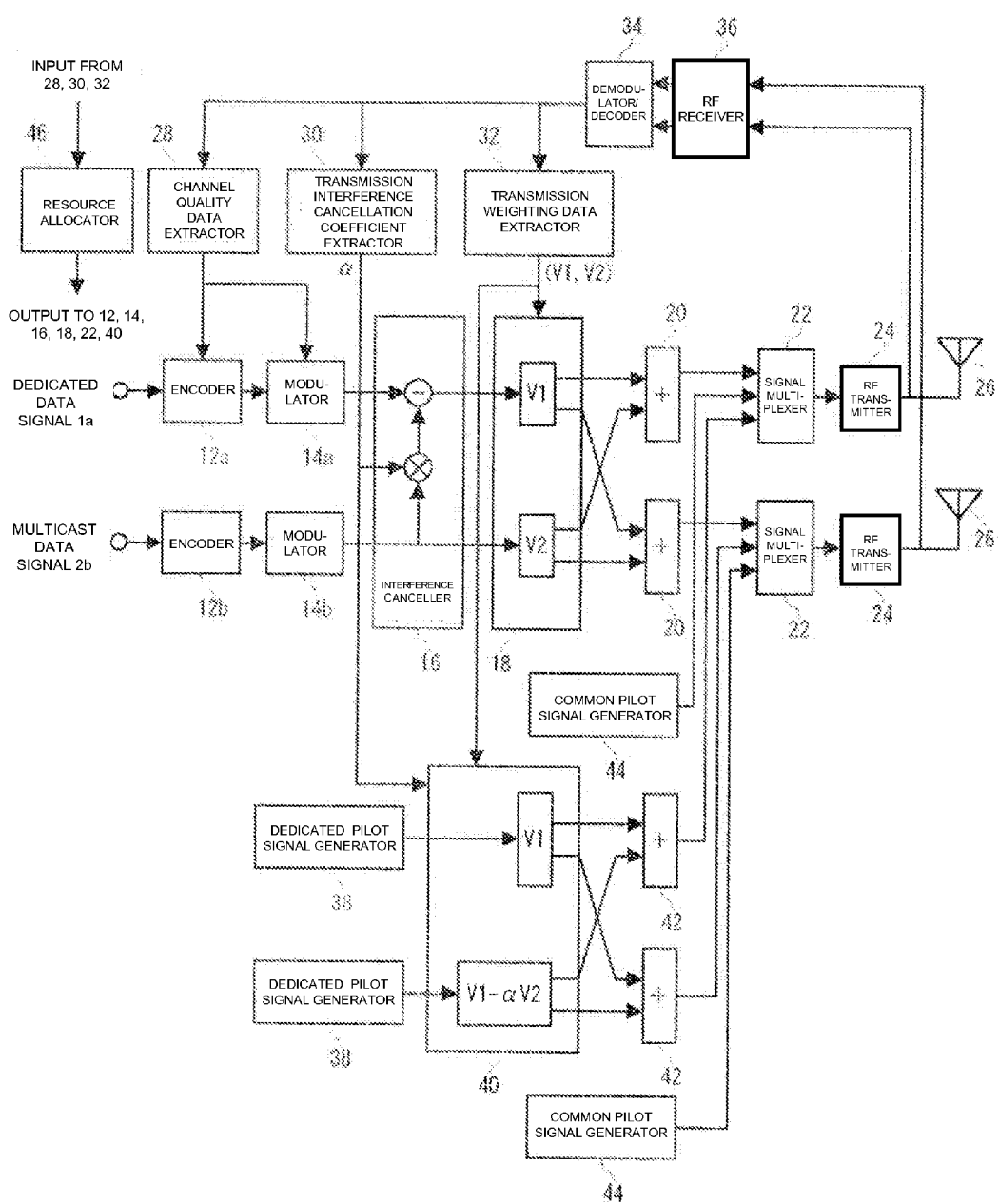
FIG. 16 is a diagram illustrating a configuration of a base station device according to a fifth embodiment.

FIG. 16 is a diagram illustrating a configuration of a base station device 10d according to a fifth embodiment. Since the configuration of a terminal device 60 is the same as the first embodiment, a description thereof will be omitted.

[Base Station Device]

As illustrated in FIG. 16, the base station device 10d comprises: an encoder 12a that encodes a dedicated data signal 1a to be transmitted to the terminal device 60; an encoder 12b that encodes a data signal 2b to be multicasted (or broadcasted); modulators 14a and 14b that modulate the respective encoded data signals; an interference canceller 16 that cancels, in advance, multicast data that becomes an interference component from the modulated signal when a dedicated data signal is received at the terminal device 60; a first transmission weight multiplier 18 that multiplies the interference-cancelled modulated signal by a transmission weight; an adder 20 that adds the interference-cancelled modulated signal; a signal multiplexer 22 that multiplexes a common pilot signal and a dedicated pilot signal onto the added modulated signal; an RF transmitter 24 that converts the multiplexed signal into a wireless signal; and a plurality of antennas 26 that transmits the wireless signal. Moreover, the RF transmitter 24 and the antennas 26 which function to transmit a signal generated by the signal multiplexer 22 correspond to the control signal transmitter and the data transmitter described in the claims.

A channel quality data extractor 28 is connected to the encoder 12a and the modulator 14a. The channel quality data extractor 28 extracts channel quality data from a reception signal received from the terminal device 60 via an RF receiver 36 and a demodulator/decoder 34. The channel quality data extractor 28 extracts channel quality data from signals received from the respective terminal devices 60. Therefore, the channel quality data has a different value for each terminal device 60. Here, channel quality data of the terminal device 60-s will be denoted as channel quality data $Q^{(s)}$. Similarly, for other parameters to be described below, whenever a different value exists for each terminal device 60, values thereof will be denoted in the same manner by adding a superscript of (s) and the like.

The channel quality data extractor 28 notifies the channel quality data $Q^{(s)}$ to the encoder 12a and the modulator 14a. Based on the channel quality data $Q^{(s)}$, the encoder 12a and the modulator 14a encode and modulate transmission data 1a to be transmitted to the terminal device 60-s.

On the other hand, based on an output from a resource allocator, the encoder 12b and the modulator 14b encode and modulate transmission data 1b to be multicasted (or broadcasted).

A transmission interference cancellation coefficient extractor 30 is connected to the interference canceller 16. The transmission interference cancellation coefficient extractor 30 extracts transmission interference cancellation coefficient data $\alpha(k-L)^{(s)}$ from a reception signal received from the terminal device 60-s via the RF receiver 36 and the demodulator/decoder 34, where k represents a discrete time and (k–L) represents a period in which a transmission weight or an interference cancellation coefficient had been measured by the terminal device 60-s.

A transmission weighting data extractor 32 is connected to the first transmission weight multiplier 18. The transmission weighting data extractor 32 extracts transmission weighting data $V1(k-L)^{(s)}$ and $V2(k-L)^{(s)}$ from a reception signal received from the terminal device 60-s. In this case, the transmission weighting data V1 and V2 is selected by a maximum SNR criterion and a minimum SNR criterion at the terminal device 60-s.

Moreover, interference cancellation coefficient data and transmission weighting data are obtained at time k based on a propagation path status before a discrete time L.

Based on the transmission interference cancellation coefficient data $\alpha(k-L)$ from the specific terminal device 60 to which dedicated data is to be transmitted, the interference canceller 16 performs interference cancellation so as to reduce interference of a multicast (or broadcast) data signal to be spatially multiplexed with the transmission of the dedicated data to the terminal device 60-s. In other words, a data signal is to be transmitted after performing interference cancellation using a data signal series $d_2(k)$ that is a multicast (or broadcast) data signal 2b on a data signal series $d_1(k)$ that is a dedicated data signal 1a addressed to a terminal device 60-1 as a specific terminal device (hereinafter, a case of s=1 will be described as a representative example) among the plurality of terminal devices 60. A data signal $g_1(k)$ addressed to a first terminal device 60-1 after interference cancellation on the data signal series $d_1(k)$ may be given by expression (1). Note that while the multicast (or broadcast) data signal series $d_2(k)$ remains unprocessed, $g_2(k)=d_2(k)$ will be assumed in the following description for the sake of subsequent formula development.

Based on transmission weighting data (V1, V2) transmitted from the terminal device 60-1 and extracted from the transmission weighting data extractor 32, the first transmission weight multiplier 18 multiplies a signal series $g_s(k)$ outputted from the interference canceller 16 by a transmission weight as given by expression (2) to generate a signal $y_g(g)$. The present embodiment represents a case where the number of spatial multiplexing is 2. V1, V2, and $y_g$ in expression (2) represent column vectors including Nt-dimensional elements, where Nt denotes the number of transmitting antennas.

The signal multiplexer 22 multiplexes a common pilot signal series $y_p(k)$, a dedicated pilot signal series $y_g(k)$, and a data signal series $y_g(k)$ using any of FDM, TDM, and CDM or a combination thereof to generate and output a pilot signal having a predetermined frame configuration.

The base station device 10d comprises a common pilot signal generator 44 and a dedicated pilot signal generator 38 that generate a common pilot signal and a dedicated pilot signal to be multiplexed onto a data signal. The common pilot signal generator 44 generates a common pilot signal series $p_n(k)$, where n denotes a natural number equal to or smaller than the number of transmitting antennas Nt and k denotes a discrete time. The common pilot signal generator 44 inputs the generated common pilot signal to the signal multiplexer 22. In other words, the common pilot signal series $p_n(k)$ is not multiplied by a transmission weight.

The dedicated pilot signal generator 38 inputs the generated dedicated pilot signal to the second transmission weight multiplier 40. A dedicated pilot signal series to be transmitted to the first terminal device 60-1 will now be described. The second transmission weight multiplier 40 multiplies a dedicated pilot signal series $q_s(k)$ by a weight based on transmission weighting data (V1, V2) and transmission interference cancellation coefficient data $\alpha(k-L)$ transmitted from the first terminal device 60-1, and outputs the dedicated pilot signal multiplied by weight. In other words, a signal is generated by multiplying an sth dedicated pilot signal series $q_s(k)$ by a transmission weight. Expression (3) represents a signal $y_q(k)$ multiplied by a transmission weight for s=1, 2, where $y_q$ denotes a column vector including an Nt-dimensional element.

The base station device 10d comprises a resource allocator 46. The resource allocator 46 determines a terminal device 60 to which dedicated data is to be transmitted based on transmission weighting data $(V1^{(m)}, V2^{(m)})$ to be outputted from the transmission weighting data extractor 32 and on reception quality data $Q^{(m)}$ to be outputted from the channel quality data extractor 28 as transmitted from the plurality of terminal devices 60-m, and allocates resources such as a frequency, a time, a sign, and the like. When a multicast (or broadcast) signal is transmitted together with a dedicated data signal to the terminal device 60-m by spatial multiplexing transmission, first, the resource allocator 46 first allocates resources such as a frequency, a time, and the like of a single terminal device 60-1 to which a dedicated data signal is to be transmitted by unicast based on reception quality data $Q^{(m)}$ outputted from the channel quality data extractor 28.

Next, transmission weighting data (V1, V2) transmitted from the resource-allocated terminal device 60-1 and outputted from the transmission weighting data extractor 32 is extracted and inputted to the first transmission weight multiplier 18. Here, the dedicated data signal 1a to be unicasted to the resource-allocated terminal device 60-1 is inputted to the encoder 12a illustrated in FIG. 16. Meanwhile, the data signal 1b to be broadcasted or multicasted that is simultaneously multiplexed at this point is inputted to the encoder 12b.

Once the terminal device 60-1 to be spatially multiplexed is determined, the resource allocator 46 notifies the terminal device 60-1 that dedicated data transmission is to be performed. In addition, a notification is also made that a multicast (or broadcast) transmission is to be simultaneously performed. In doing so, control information including MCS data and transmission power data during data transmission is to be transmitted as a control signal. When dedicated data transmission is to be performed at a power equivalent to a transmission power during transmission of a dedicated pilot signal, transmission power data of the dedicated data signal need not be included in control information. In addition, as an alternative method, when sending a dedicated data signal at a different transmission power than the dedicated pilot signal, control information including transmission power data is to be transmitted from the base station device 10d to the terminal device 60.

[Terminal Device]

Since the configuration of the terminal device 60 is the same as the configuration according to the first embodiment described with reference to FIG. 2, a description thereof will be omitted.

[Operations of Wireless Communication System]

Figure 17:
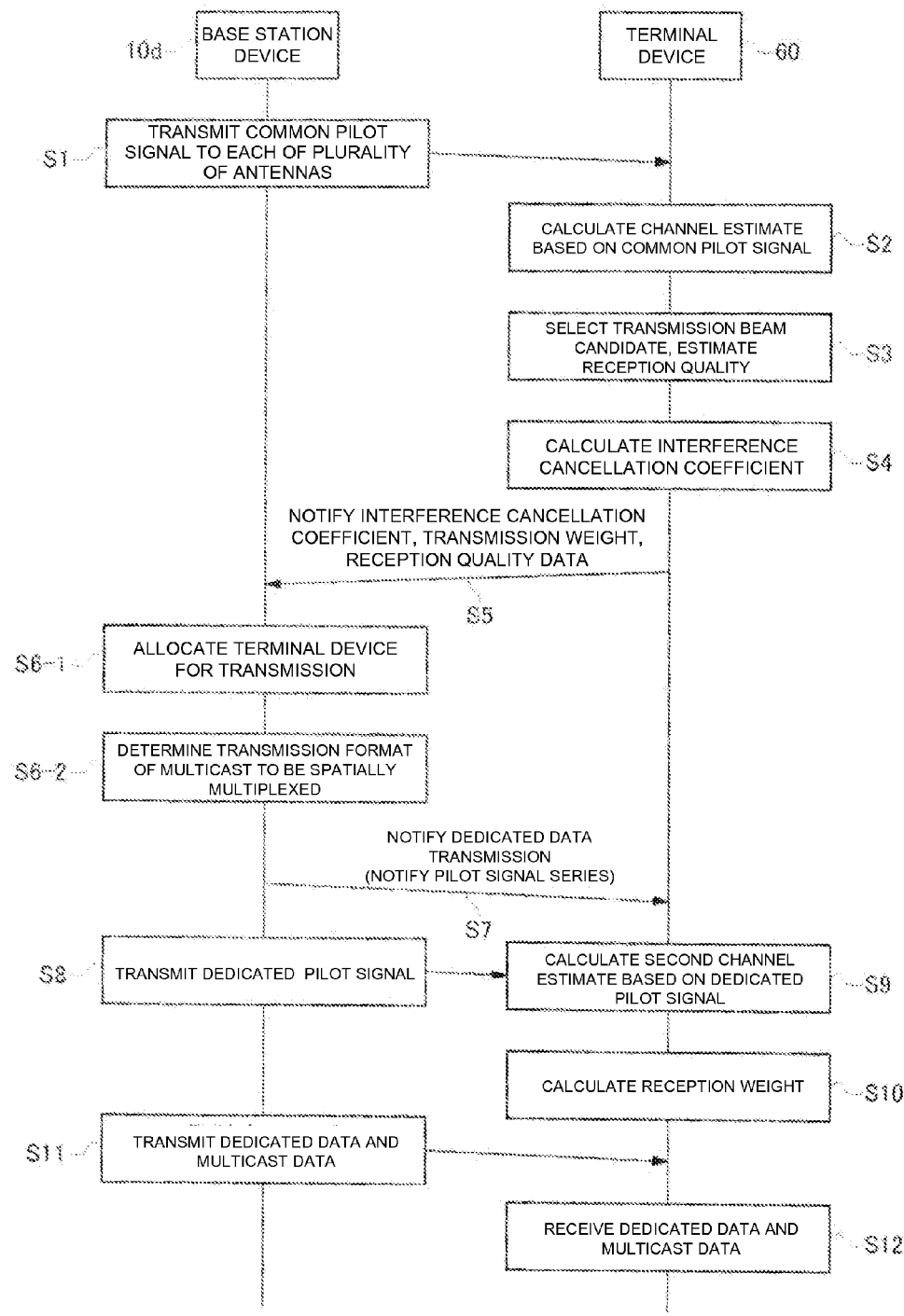
FIG. 17 is a diagram illustrating operations of a wireless communication system according to the fifth embodiment.

FIG. 17 is a flow chart illustrating operations of a wireless communication system according to the present embodiment. Hereinafter, operations of the wireless communication system will be described with reference to FIG. 17. An nth common pilot signal generator 44 of the base station device 10d generates a common pilot signal series $p_n(k)$ and transmits the generated common pilot signal to the terminal device 60 (step S1).

Upon receiving the common pilot signal transmitted from the base station device 10d, the terminal device 60 performs channel estimation based on a reception result of a common pilot signal $y_p(k)$ and calculates a channel estimate (step S2). The transmission weight selector 70 of the terminal device 60 then selects specific transmission weights (V1, V2) according to the selection criteria described earlier from a fixed transmission weight group $u_n$ that is mutually known between the base station device 10d and the terminal device 60, and further estimates a reception quality based on a maximum SNR in the event that a data signal is transmitted using the selected transmission weight V1 (step S3).

Subsequently, the transmission interference cancellation coefficient calculator 74 of the terminal device 60-m calculates an interference cancellation coefficient α(m) (step S4). As described earlier, the interference cancellation coefficient α(m) assumes that: transmission is performed using the transmission weight V2 to another terminal device 60 to be spatially multiplexed; transmission is performed using the transmission weight V1 to a terminal device 60 of the same base station; and reception is performed at the receiving side using a maximum ratio combining weight.

The control signal generator 76 of the terminal device 60 generates a control signal for feeding back interference cancellation coefficient data, channel reception quality data, and selected transmission weighting data to the base station device 10d, and notifies the generated control signal to the base station device 10d (step S5).

The base station device 10d uses the resource allocator 46 to determine a terminal device 60 to which dedicated data transmission is to be performed based on transmission weighting data (V1$^{(m)}$, V2$^{(m)}$) and reception quality data Q$^{(m)}$ transmitted from the plurality of terminal devices 60, and allocates resources such as a frequency, a time, a sign, and the like (step S6-1). Subsequently, a transmission format such as a code, a modulation, and the like is determined in regards to a data signal to be multicast (or broadcast) and spatially multiplexed with the terminal device 60 to which dedicated data is to be transmitted (step S6-2). After a unicast and a multicast (or a broadcast) signal to the terminal device 60 to be spatially multiplexed is determined, the base station device 10d notifies the terminal device 60 to which dedicated data transmission is to be performed and the terminal device 60 that is a target of the multicast (or a broadcast) that data transmission is to be performed (step S7). Additionally, in doing so, control information including MCS (Modulation and coding scheme) data and transmission power data during data transmission is to be transmitted as a control signal.

The terminal device 60 uses the control information extractor 84 to extract control information including resource allocation data, dedicated pilot signal series data, channel quality data when performing data transmission (MCS data), and power transmission data from the control signal transmitted from the base station device 10d (step S7).

After notification of dedicated data transmission and multicast (or broadcast), the base station device 10d transmits a dedicated pilot signal to the terminal device 60 (step S8). The dedicated pilot signal transmitted at this point is a signal obtained by multiplying a dedicated pilot signal series $q_s(k)$ by a weight based on transmission weighting data (V1$^{(m1)}$, V2$^{(m1)}$) and on transmission interference cancellation coefficient data α(k−L)$^{(m1)}$.

Upon receiving a dedicated pilot signal, the terminal device 60 uses the second channel estimator 88 to perform channel estimation based on a reception result of the dedicated pilot signal $y_q(k)$ and calculates a channel estimate (step S9). The reception weight calculator/multiplier 90 of the terminal device 60 uses the second channel estimation matrix estimated by the second channel estimator 88 to calculate a reception weight (step S10), and multiplies an output signal from the RF receiver 64 by the reception weight.

The base station device 10d processes the data signal 1a and the multicast (or broadcast) data signal 1b to be transmitted to the terminal device 60 with the encoders 12a and 12b, the modulators 14a and 14b, the interference canceller 16, and the first transmission weight multiplier 18, and transmits the processed dedicated data to the terminal device 60 (step S11). Upon receiving the dedicated data 1a or the multicast (or broadcast) data signal 1b from the base station device 10d, the terminal device 60 uses the demodulator 92 and the decoder 94 to perform a demodulating operation and a decoding operation on an output of the reception weight calculator/multiplier 90 (step S12). This concludes the description on configurations and operations of the base station device 10d and the terminal device 60 according to the present embodiment.

[Advantageous Effects of the Present Embodiment]

According to the present embodiment, in the same manner as the first embodiment, when there are no error fluctuations in a propagation channel at a time of data signal transmission, the terminal device 60-1 to which dedicated data is to be transmitted can perform reception without being affected by a same-channel interference signal due to a multicast (or broadcast) signal to be spatially multiplexed. Moreover, reception can be performed without being affected by a same-channel interference signal due to a multicast (or broadcast) signal to be spatially multiplexed by calculating a reception weight using when a result of a channel estimation matrix H($m_s$) obtained by the first channel estimator 68 of the terminal device 60-$m_s$ and a channel estimate Z($m_s$) obtained by the second channel estimator 88 when a propagation channel at the time of data transmission include error fluctuations. In addition to such similar advantageous effects to the first embodiment, in the present embodiment, since terminal devices 60 other than the terminal device 60-1 are now capable of receiving a multicast (or broadcast) signal to be transmitted by spatial multiplexing while suppressing degradation of reception quality at the terminal device 60 with respect to a dedicated data signal to be unicast-transmitted to the terminal device 60, frequency utilization efficiency can be further enhanced.

Figure 18:
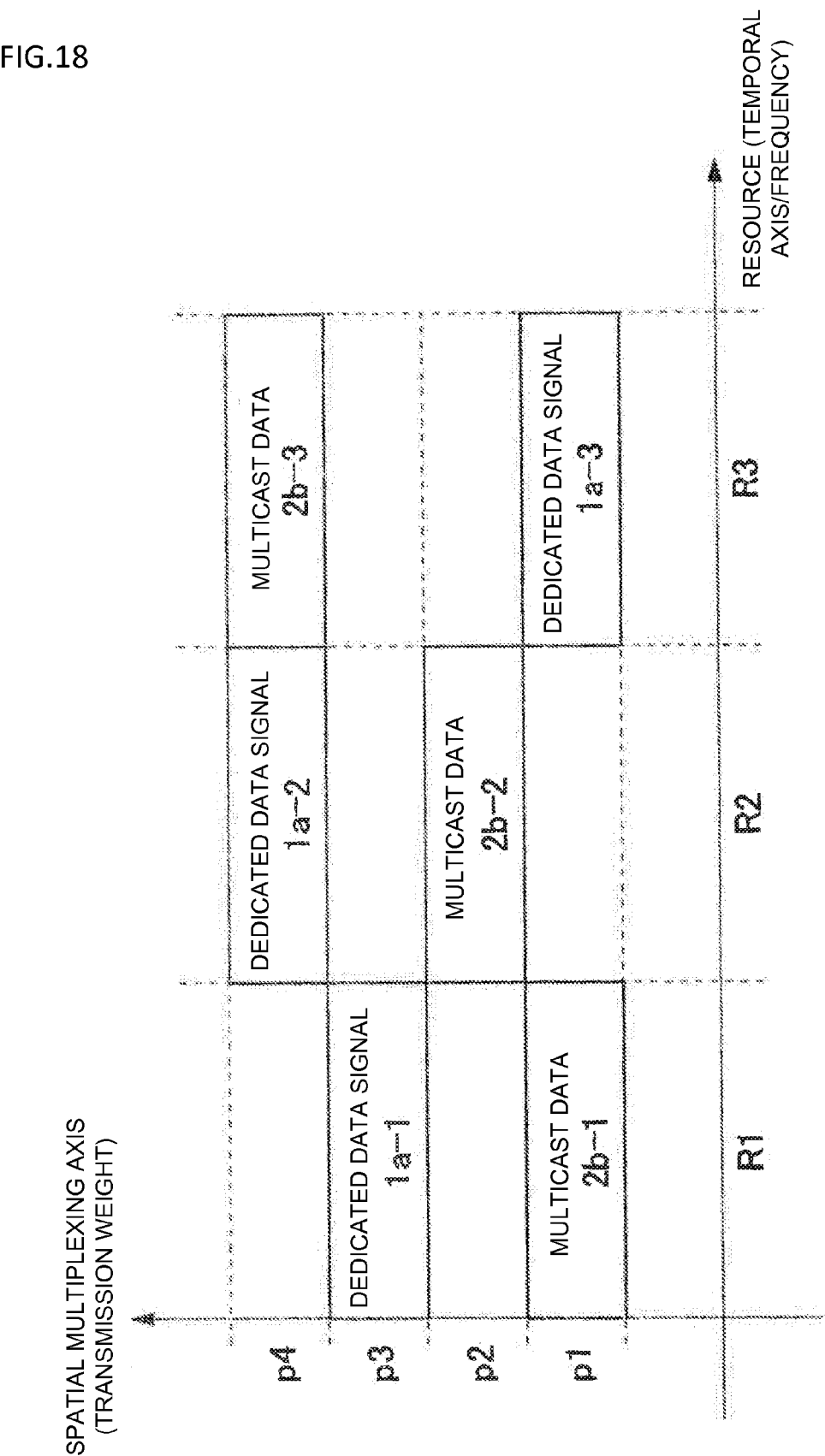
FIG. 18 is a diagram for describing operations for averaging reception quality in an area.

In the present embodiment, since a multicast (or broadcast) signal is directionally transmitted due to the use of a transmission weight V2 by the transmission weight multiplier 18, depending on a location of the terminal device 60 within an area, there is a possibility that multicast (or broadcast) reception quality may decline. Therefore, the application of a method such as described below is effective in averaging localized reception quality of the terminal device 60 within the area. Specifically, when data with the same content is repetitively transmitted (repetition transmission) and respective multicast (or broadcast) signals are also repetitively transmitted, the resource allocator 46 allocates a terminal device 60-$s$ and transmits a dedicated data signal 1a-$k$ so that the transmission weight V2 when transmitting a multicast (or broadcast) signal differs for each repetition transmission. Hereinafter, a detailed description of the operation will be given with reference to FIG. 18. FIG. 18 illustrates transmission weights to be respectively used for a kth multicast (or broadcast) data signal 2b-k to be repetitively transmitted (repetition transmission) and the dedicated data signal 1a-k to be transmitted together with the data signal 2b-k by spatial multiplexing when a resource Rk that differs on a temporal axis or a frequential axis is allocated. Moreover, while FIG. 18 illustrates a case where the number of repetition transmissions of the multicast (or broadcast) data signal is three (i.e., k=1, 2, 3) and four (p1, p2, p3, p4) transmission weights V1 or V2 can be selected, the respective numbers are nonrestrictive. As illustrated in FIG. 18, the resource allocator 46 allocates a terminal device 60 such that the transmission weight V2(k) differs for each kth repetition transmission of the multicast (or broadcast) signal. Accordingly, an averaging effect of localized reception quality of the terminal device 60 within the area can be achieved.

Moreover, in the present embodiment, transmission power control may be added when transmitting a dedicated data signal. Alternatively, a multicast (or broadcast) signal may be arranged so as to be transmitted by spatial multiplexing only when transmission power is lower than a predetermined value as a result of transmission power control on a dedicated data signal. In this case, an effect may be achieved in that multicast (or broadcast) reception quality can also be ensured for terminal devices positioned in the vicinity of cell edges.

While there has been described what is at present considered to be the preferred embodiments of the present invention, it will be understood that various modifications may be made therein, and it is intended to cover in the appended claims all such modifications as fall within the true spirit and scope of the present invention.

INDUSTRIAL APPLICABILITY

As described above, the present invention has a beneficial effect in that reception property degradation attributable to performing interference cancellation in advance on a modulation signal to be transmitted can now be suppressed by a base station device. Consequently, a base station device according to the present invention is useful as a base station or the like that performs for example, space division multiple access.

The invention claimed is:

1. A base station device that communicates with a first terminal device and a second terminal device over the same channel by spatial multiplexing, the base station device comprising:
    an interference cancellation coefficient extractor that extracts, from a signal received from the first terminal device, an interference cancellation coefficient for use in cancellation of interference on a propagation channel with the second terminal device, wherein the interference cancellation coefficient is calculated by using a transmission weight;
    an interference canceller that generates first transmission data to be transmitted to the first terminal device by using the interference cancellation coefficient;
    a transmission weight multiplier that multiplies the first transmission data and a second transmission data by the transmission weight, wherein the second transmission data is transmitted to the second terminal device;
    a signal multiplier that generates a multiplied signal by using the first transmission data and the second transmission data, wherein the first transmission data and the second transmission data are multiplied by the transmission weight respectively; and
    a data transmitter that transmits the multiplied signal over the same channel.

2. The base station device according to claim 1, further comprising:
    a control signal generator that generates a control signal including a pilot signal generated by using the interference cancellation coefficient and the transmission weight, wherein the signal multiplier generates the multiplied signal by using the first transmission data, the second transmission data and the control signal, and wherein the first transmission data and the second transmission data are multiplied by the transmission weight respectively.

3. The base station device according to claim 1, further comprising:
    a control signal generator that generates a control signal including the information of the interference cancellation coefficient and the information of the transmission weight and generates the multiplied signal by using the first transmission data, the second transmission data and the control signal, wherein first transmission data and the second transmission data are multiplied by the transmission weight respectively.

4. The base station device according to claim 3, wherein the control signal generator generates the control signal that is multiplied by the transmission weight.

5. The base station device according to claim 2, wherein the transmission weight to be multiplied is the same weighting as the weight to be multiplied by the pilot signal.

6. The base station device according to claim 1, wherein:
    the interference cancellation coefficient extractor comprises an interference cancellation coefficient storage that stores the interference cancellation coefficient in association with an identifier,
    the interference cancellation coefficient extractor extracts information on an identifier indicating the interference cancellation coefficient, and
    the interference canceller reads out an interference cancellation coefficient corresponding to the identifier from the interference cancellation coefficient storage and uses the interference cancellation coefficient to cancel an interference component.

7. A terminal device that communicates with a base station device that performs spatial multiplexing with a plurality of terminal devices, the terminal device comprising:
    an interference cancellation coefficient calculator that calculates an interference cancellation coefficient by using a transmission weight to be transmitted to the base station;
    a signal receiver that receives a control signal transmitted from the base station device and which includes a pilot signal generated based on an interference cancellation coefficient and the transmission weight.

8. A wireless communication system comprising a plurality of terminal devices and a base station device that communicates with a first terminal device and a second terminal device among the plurality of terminal devices over the same channel by spatial multiplexing, wherein
    the first terminal device comprises:
    an interference cancellation coefficient calculator that calculates an interference cancellation coefficient by using a transmission weight to be transmitted to the base station device; and
    a transmitter that transmits the interference cancellation coefficient to the base station device, the base station device comprises:
a receiver that receives the interference cancellation coefficient from the first terminal device;
a control signal generator that generates a control signal including the information of the interference cancellation coefficient and the information of the transmission weight;
a control signal generator that generates a control signal including the information of the interference cancellation coefficient and the information of the transmission weight;
an interference canceller that generates first transmission data to be transmitted to the first terminal device by using the interference cancellation coefficient; and
a weight multiplier that multiplies the first transmission data and the second transmission data by the transmission weight, wherein the second transmission data is transmitted to the second terminal device;
a signal multiplier that generates a multiplied signal by using the first transmission data, the second transmission data and the control signal, wherein the first transmission data and the second transmission data are multiplied by the transmission weight respectively; and
a data transmitter that transmits the multiplied data over the same channel, and
the second terminal device comprises:
a receiver that receives the multiplied signal including the control signal transmitted from the base station device;
a channel estimator that calculates an estimate on a propagation channel between the second terminal device and the base station device by using the interference cancellation coefficient included in the control signal; and
a demodulator that demodulates the second transmission data transmitted from the base station device by using the estimate on the propagation channel.

9. A wireless communication method used by a base station device that communicates with a first terminal device and a second terminal device over the same channel by spatial multiplexing, the wireless communication method comprising the steps of:
the base station device extracting, from a signal received from the first terminal device, an interference cancellation coefficient for use in cancellation of interference on a propagation channel with the second terminal device, wherein the interference cancellation coefficient is calculated by using a transmission weight;
generating first transmission data to be transmitted to the first terminal device by using the interference cancellation coefficient;
multiplying the first transmission data and the second transmission data by the transmission weight, wherein the second transmission data is transmitted to the second terminal device;
generating multiplied signal by using the first transmission data and the second transmission data, wherein the first transmission data and the second transmission data are multiplied by the transmission weight respectively; and
transmitting the multiplied signal over the same channel.

10. A base station device that transmits a unicast signal to be transmitted to a first terminal device and a multicast or broadcast signal to be transmitted to a plurality of groups of terminal devices by spatial multiplexing over a same channel, the base station device comprising:
an interference cancellation coefficient extractor that extracts, from a signal received from the first terminal device, an interference cancellation coefficient for use in cancellation of interference on a propagation channel with the plurality of groups of terminal devices, wherein the interference cancellation coefficient is calculated by using a transmission weight;
an interference canceller that generates first transmission data to be transmitted to the first terminal device by using the interference cancellation coefficient;
a transmission weight multiplier that multiplies the first transmission data and third transmission data by the transmission weight, wherein the third transmission data is transmitted to the plurality of groups of terminal devices;
a signal multiplier that generates a multiplied signal by using the first transmission data and the third transmission data, wherein the first transmission data and the third transmission data are multiplied by the transmission weight respectively; and
a data transmitter that transmits the multiplied signal over the same channel.

11. A wireless communication system comprising a plurality of terminal devices and a base station device that transmits a unicast signal to be transmitted to a first terminal device among the plurality of terminal devices and a multicast or broadcast signal to be transmitted to a plurality of groups of terminal devices by spatial multiplexing over a same channel, wherein
the first terminal device comprises:
an interference cancellation coefficient calculator that calculates an interference cancellation coefficient by using a transmission weight to be transmitted to the base station device; and
a transmitter that transmits the interference cancellation coefficient to the base station device,
the base station device comprises:
a receiver that receives the interference cancellation coefficient from the first terminal device;
an interference canceller that generates first transmission data to be transmitted to the first terminal device by using the interference cancellation coefficient;
a control signal generator that generates a control signal including the information of the interference cancellation coefficient and the information of the transmission weight;
a weight multiplier that multiplies the first transmission data and third transmission data by the transmission weight, wherein the third transmission data is transmitted to the plurality of groups of terminal devices;
a signal multiplier that generates a multiplied signal by using the first transmission data and the third transmission data, wherein the first transmission data and the third transmission data are multiplied by the transmission weight respectively;
a transmitter that transmits the multiplied signal over the same channel, and
the plurality of groups of terminal devices comprises:
a receiver that receives the multiplied signal including the control signal transmitted from the base station device;
a channel estimator that calculates an estimate on a propagation channel with the base station device by using the interference cancellation coefficient included in the control signal; and
a demodulator that demodulates the third transmission data transmitted from the base station device by using an estimate on the propagation channel.

12. A wireless communication method used by a base station device that transmits a unicast signal to be transmitted to a first terminal device and a multicast or broadcast signal to be transmitted to a plurality of groups of terminal devices by spatial multiplexing over a same channel, the wireless communication method comprising the steps of:

the base station device extracting, from the first terminal device, an interference cancellation coefficient for use in cancellation of interference on a propagation channel with the plurality of groups of terminal devices, wherein the interference cancellation coefficient is calculated by using a transmission weight;

generating first transmission data to be transmitted to the first terminal device by using the interference cancellation coefficient;

multiplying the first transmission data and third transmission data by the transmission weight, wherein the third transmission data is transmitted to the plurality of groups of terminal devices;

generating a multiplied signal by using the first transmission data and the third transmission data, wherein the first transmission data and the third transmission data are multiplied by the transmission weight respectively; and transmitting the multiplied signal over the same channel.

* * * * *